United States Patent
Prakash et al.

(10) Patent No.: US 11,172,397 B2
(45) Date of Patent: Nov. 9, 2021

(54) TIMING INFORMATION FOR MULTIPLE PERIODIC TRAFFIC STREAMS SHARING A SAME QUALITY OF SERVICE

(71) Applicant: QUALCOMM Incorporated, San Diego, CA (US)

(72) Inventors: Rajat Prakash, San Diego, CA (US); Vinay Joseph, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 16/598,570

(22) Filed: Oct. 10, 2019

(65) Prior Publication Data
US 2020/0120536 A1 Apr. 16, 2020

Related U.S. Application Data

(60) Provisional application No. 62/745,546, filed on Oct. 15, 2018.

(51) Int. Cl.
| | |
|---|---|
| H04W 28/02 | (2009.01) |
| H04L 12/851 | (2013.01) |
| H04W 72/12 | (2009.01) |
| H04W 28/10 | (2009.01) |

(52) U.S. Cl.
CPC ......... *H04W 28/0268* (2013.01); *H04L 47/24* (2013.01); *H04W 28/10* (2013.01); *H04W 72/1205* (2013.01); *H04W 72/1284* (2013.01)

(58) Field of Classification Search
CPC .......................... H04W 28/0268; H04W 28/10
See application file for complete search history.

(56) References Cited

U.S. PATENT DOCUMENTS

| | | | |
|---|---|---|---|
| 10,044,524 B1* | 8/2018 | Edelhaus | H04L 65/80 |
| 2010/0265823 A1 | 10/2010 | Zhao et al. | |
| 2015/0189539 A1 | 7/2015 | Li | |
| 2019/0007941 A1* | 1/2019 | Cavalcanti | H04L 5/14 |
| 2019/0253339 A1* | 8/2019 | Mehmedagic | H04L 45/3065 |
| 2019/0342785 A1* | 11/2019 | Li | H04L 47/34 |
| 2020/0059829 A1* | 2/2020 | Joseph | H04W 36/08 |
| 2020/0112975 A1* | 4/2020 | Moon | H04J 3/0667 |
| 2020/0280522 A1* | 9/2020 | Frangieh | H04L 67/34 |

OTHER PUBLICATIONS

International Search Report and Written Opinion—PCT/US2019/055846—ISA/EPO—dated Jan. 8, 2020.

* cited by examiner

*Primary Examiner* — Min Jung
(74) *Attorney, Agent, or Firm* — Holland & Hart LLP

(57) ABSTRACT

Methods, systems, and devices for wireless communications are described. A wireless device, such as a base station, may receive a request to establish a data flow with a user equipment (UE), the data flow being associated with a quality of service (QoS) class, where the UE supports a plurality of traffic streams associated with the QoS class of the data flow, each traffic stream being between a downstream endpoint and an upstream endpoint via both the UE and the first node of the RAN. In some cases, the base station may receive timing information for the data flow via one or more system messages associated with the data flow, where the timing information is based at least in part on the plurality of traffic streams associated with the QoS class of the data flow, and establish the data flow based at least in part on the timing information.

30 Claims, 17 Drawing Sheets

TIMING INFORMATION FOR MULTIPLE PERIODIC TRAFFIC STREAMS SHARING A SAME QUALITY OF SERVICE

CROSS REFERENCE

The present application for patent claims the benefit of U.S. Provisional Patent Application No. 62/745,546 by PRAKASH et al., entitled "TIMING INFORMATION FOR MULTIPLE PERIODIC TRAFFIC STREAMS SHARING A SAME QUALITY OF SERVICE," filed Oct. 15, 2018, assigned to the assignee hereof, and which is expressly incorporated by reference herein.

BACKGROUND

The following relates generally to wireless communications, and more specifically to timing information for multiple periodic traffic streams sharing a same quality of service.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A wireless multiple-access communications system may include a number of base stations and/or network access nodes, each simultaneously supporting communication for multiple communication devices, which may be otherwise known as user equipment (UE). In some cases, various applications (e.g., motion control, discrete manufacturing, etc.) may utilize strict timing between two endpoints for command and control communications. For example, time sensitive networking (TSN) may provide that various TSN endpoints within a TSN network may have synchronized timing such that performance of functions (e.g., an industrial controller providing commands to a manufacturing robot) is synchronized between endpoints. In cases where all or a portion of a data flow supporting TSN endpoints is transmitted via a wireless multiple-access system, techniques for maintaining time synchronization between the TSN endpoints are needed.

SUMMARY

The described techniques relate to improved methods, systems, devices, and apparatuses that support timing information for multiple periodic traffic streams sharing a same quality of service. Generally, the described techniques provide for utilizing timing information for a data flow, where the data flow is to be established between time sensitive network (TSN) endpoints in a radio access network (RAN) via a user equipment (UE) and a RAN node, such as a base station, such that admission control and scheduling can be optimized in the network. In some cases, the data flow may be associated with a quality of service (QoS) or traffic class, and the UE may communicate with a set of downstream endpoints via one or more traffic streams, each of which may be characterized with a period and/or an offset. In some circumstances, there may be no mechanism to distinguish between the different traffic streams mapped to a particular QoS flow, for example, due to an absence of stream specific packet filters, which may lead to degraded network performance. In some cases, the RAN may need to utilize dynamic grants for scheduling transmission of one or more TSN traffic packets due to absence of period/offset information, which may increase overhead (i.e., amount of PDCCH resources required), and limit the capacity (i.e., number of supported UEs or TSN endpoints) of the network.

Thus, techniques for utilizing the knowledge of period/offset of different TSN traffic streams, as described herein, may allow for improved communications. In some cases, the received timing information may comprise a plurality of time offset indications, and one or more other parameters such as a periodicity of traffic, traffic direction, packet size parameters, burst size parameters, etc., associated with the plurality of traffic streams associated with the QoS class of the data flow. In some aspects, the knowledge of period and/or offsets may serve to optimize scheduling in the RAN, by reducing the amount of downlink control channel (e.g., Physical Downlink Control Channel (PDCCH)) resources required for scheduling. In some other cases, the presence of period/offset information for the plurality of traffic streams associated with the QoS class of the data flow may limit the impact (e.g., by puncturing) of the TSN traffic transmissions on a non-URLLC transmission. For instance, in some cases, TSN traffic may interrupt or puncture transmissions with lower latency requirements. With the period and offset information known by the RAN (e.g., a node in the RAN), interruption or puncturing of transmissions with lower latency requirements than the TSN traffic transmissions may be limited or avoided.

A method of wireless communication at a first node of a radio access network (RAN) is described. The method may include receiving a request to establish a data flow with a UE, the data flow being associated with a QoS class, where the UE supports a plurality of traffic streams, each traffic stream being between a downstream endpoint and an upstream endpoint via both the UE and the first node of the RAN, receiving timing information for the data flow via one or more system messages associated with the data flow, where the timing information is based on the plurality of traffic streams associated with the QoS class of the data flow, and establishing the data flow based on the timing information.

An apparatus for wireless communication at a first node of a RAN is described. The apparatus may include a processor, memory coupled with the processor, and instructions stored in the memory. The instructions may be executable by the processor to cause the apparatus to receive a request to establish a data flow with a UE, the data flow being associated with a QoS class, where the UE supports a plurality of traffic streams, each traffic stream being between a downstream endpoint and an upstream endpoint via both the UE and the first node of the RAN, receive timing information for the data flow via one or more system messages associated with the data flow, where the timing information is based on the plurality of traffic streams associated with the QoS class of the data flow, and establish the data flow based on the timing information.

Another apparatus for wireless communication at a first node of a RAN is described. The apparatus may include means for receiving a request to establish a data flow with a UE, the data flow being associated with a QoS class, where the UE supports a plurality of traffic streams, each traffic stream being between a downstream endpoint and an upstream endpoint via both the UE and the first node of the RAN, receiving timing information for the data flow via one or more system messages associated with the data flow, where the timing information is based on the plurality of traffic streams associated with the QoS class of the data flow, and establishing the data flow based on the timing information.

A non-transitory computer-readable medium storing code for wireless communication at a first node of a RAN is described. The code may include instructions executable by a processor to receive a request to establish a data flow with a UE, the data flow being associated with a QoS class, where the UE supports a plurality of traffic streams, each traffic stream being between a downstream endpoint and an upstream endpoint via both the UE and the first node of the RAN, receive timing information for the data flow via one or more system messages associated with the data flow, where the timing information is based on the plurality of traffic streams associated with the QoS class of the data flow, and establish the data flow based on the timing information.

In some examples of the method, apparatuses, and non-transitory computer-readable medium described herein, receiving timing information for the data flow may include operations, features, means, or instructions for receiving timing information that may be based on a period and an offset for each of the set of traffic streams associated with the QoS class of the data flow.

In some examples of the method, apparatuses, and non-transitory computer-readable medium described herein, receiving timing information for the data flow may include operations, features, means, or instructions for receiving a set of time offset indications associated with communicating with the set of downstream endpoints, where the downstream endpoint may be a TSN endpoint.

In some examples of the method, apparatuses, and non-transitory computer-readable medium described herein, receiving timing information for the data flow further may include operations, features, means, or instructions for receiving one or more of a traffic periodicity, a traffic direction, a bit rate parameter, a packet data budget (PDB) parameter, a packet error loss rate (PER) parameter, a burst size parameter, or one or more packet size parameters, associated with one or more of the traffic streams associated with the QoS class of the data flow.

In some examples of the method, apparatuses, and non-transitory computer-readable medium described herein, receiving timing information for the data flow further may include operations, features, means, or instructions for receiving one or more of an uplink time offset, a downlink time offset, or a time offset associated with a first downstream endpoint of the set of downstream endpoints, for one or more traffic streams of the plurality of traffic streams associated with the QoS class of the data flow.

In some examples of the method, apparatuses, and non-transitory computer-readable medium described herein, receiving timing information for the data flow further may include operations, features, means, or instructions for determining one or more of a semi-persistent scheduling (SPS) configuration, a configured scheduling (CS) configuration, or an indication to establish the data flow, accept a change to the data flow, or a combination thereof.

In some examples of the method, apparatuses, and non-transitory computer-readable medium described herein, each of the set of time offset indications includes one or more of a time offset start indication, a time offset end indication, a time offset duration indication, or a packet delivery deadline indication.

Some examples of the method, apparatuses, and non-transitory computer-readable medium described herein may further include operations, features, means, or instructions for applying each of the set of time offset indications with respect to a TSN time reference, and where the TSN time reference may be one of a set of TSN time references associated with the RAN.

In some examples of the method, apparatuses, and non-transitory computer-readable medium described herein, the set of traffic streams associated with the QoS class of the data flow include aperiodic traffic streams, periodic traffic streams, or a combination thereof.

In some examples of the method, apparatuses, and non-transitory computer-readable medium described herein, establishing the data flow may include operations, features, means, or instructions for configuring one or more of semi-persistent scheduling (SPS), configured scheduling (CS), admission control, or a combination thereof, for the data flow.

In some examples of the method, apparatuses, and non-transitory computer-readable medium described herein, receiving timing information for the data flow may include operations, features, means, or instructions for receiving one or more of a TSN adaptation function, an access and mobility management function (AMF), a user plane function (UPF), a session management function (SMF), a policy control function (PCF), an application function, or any combinations thereof.

In some examples of the method, apparatuses, and non-transitory computer-readable medium described herein, the one or more system messages include a first system message from the TSN adaptation function to the PCF, a second system message from the PCF to the SMF, a third system message from the SMF to the AMF, and a fourth system message from the AMF to the RAN.

In some examples of the method, apparatuses, and non-transitory computer-readable medium described herein, the one or more system messages include a first system message from the TSN adaptation function to the PCF, a second system message from the PCF to the AMF, and third system message from the AMF to the RAN.

In some examples of the method, apparatuses, and non-transitory computer-readable medium described herein, establishing the data flow may include operations, features, means, or instructions for receiving a handover message from a second node in the RAN, where the handover message indicates that the data flow may be to be handed over from the second node to the first node.

In some examples of the method, apparatuses, and non-transitory computer-readable medium described herein, the first node of the RAN may be a base station or a user plane function (UPF) associated with the RAN. In some examples of the method, apparatus, and non-transitory computer readable medium described herein, the UE communicates with a set of downstream endpoints via the plurality of traffic streams.

Some examples of the method, apparatuses, and non-transitory computer-readable medium described herein may further include operations, features, means, or instructions for applying the timing information based on a timing configuration for the data flow, where the timing information may be provided by one or more of, subscription information associated with the UE stored in one or more of a unified data repository (UDR), an authentication server function (AUSF), or a home subscriber server (HSS); or, and preconfigured information provided by a network function or a RAN node.

A method of wireless communication at a network entity is described. The method may include establishing a data flow between a UE and a first node associated with a RAN, the data flow being associated with a QoS class, where the UE supports a plurality of traffic streams, each traffic stream being between a downstream endpoint and an upstream endpoint via both the UE and the first node of the RAN, receiving timing information for the data flow via one or more system messages associated with the data flow, the timing information associated with a TSN and at least one TSN adaptation function associated with the RAN, and where the timing information is based on a set of traffic streams associated with the QoS class of the data flow, and relaying the timing information to one or more other nodes associated with the RAN.

An apparatus for wireless communication at a network entity is described. The apparatus may include a processor, memory coupled with the processor, and instructions stored in the memory. The instructions may be executable by the processor to cause the apparatus to establish a data flow between a UE and a first node associated with a RAN, the data flow being associated with a QoS class, where the UE supports a plurality of traffic streams, each traffic stream being between a downstream endpoint and an upstream endpoint via both the UE and the first node of the RAN, receive timing information for the data flow via one or more system messages associated with the data flow, the timing information associated with a TSN and at least one TSN adaptation function associated with the RAN, and where the timing information is based on the plurality of traffic streams associated with the QoS class of the data flow, and relay the timing information to one or more other nodes associated with the RAN.

Another apparatus for wireless communication at a network entity is described. The apparatus may include means for establishing a data flow between a UE and a first node associated with a RAN, the data flow being associated with a QoS class, where the UE supports a plurality of traffic streams, each traffic stream being between a downstream endpoint and an upstream endpoint via both the UE and the first node of the RAN, receiving timing information for the data flow via one or more system messages associated with the data flow, the timing information associated with a TSN and at least one TSN adaptation function associated with the RAN, and where the timing information is based on a set of traffic streams associated with the QoS class of the data flow, and relaying the timing information to one or more other nodes associated with the RAN.

A non-transitory computer-readable medium storing code for wireless communication at a network entity is described. The code may include instructions executable by a processor to establish a data flow between a UE and a first node associated with a RAN, the data flow being associated with a QoS class, where the UE supports a plurality of traffic streams, each traffic stream being between a downstream endpoint and an upstream endpoint via both the UE and the first node of the RAN, receive timing information for the data flow via one or more system messages associated with the data flow, the timing information associated with a TSN and at least one TSN adaptation function associated with the RAN, and where the timing information is based on a set of traffic streams associated with the QoS class of the data flow, and relay the timing information to one or more other nodes associated with the RAN.

In some examples of the method, apparatuses, and non-transitory computer-readable medium described herein, receiving timing information for the data flow may include operations, features, means, or instructions for receiving timing information that may be based on a period and an offset for each of the set of traffic streams associated with the QoS class of the data flow.

In some examples of the method, apparatuses, and non-transitory computer-readable medium described herein, receiving timing information for the data flow may include operations, features, means, or instructions for receiving a set of time offset indications associated with communicating between the set of downlink endpoints and a set of corresponding uplink endpoints.

In some examples of the method, apparatuses, and non-transitory computer-readable medium described herein, receiving timing information for the data flow may include operations, features, means, or instructions for receiving one or more of a traffic periodicity, a traffic direction, a bit rate parameter, a PDB parameter, a PER parameter, a burst size parameter, or one or more packet size parameters associated with one or more of the traffic streams associated with the QoS class of the data flow.

In some examples of the method, apparatuses, and non-transitory computer-readable medium described herein, receiving timing information for the data flow may include operations, features, means, or instructions for receiving one or more of an uplink time offset, a downlink time offset, or a time offset associated with a first downlink endpoint of the set of downlink endpoints, for one or more traffic streams of the set of traffic streams associated with the QoS class of the data flow.

In some examples of the method, apparatuses, and non-transitory computer-readable medium described herein, receiving timing information for the data flow may include operations, features, means, or instructions for determining one or more of a SPS configuration, a CS configuration, or an indication to establish the data flow, accept a change to the data flow, or a combination thereof.

In some examples of the method, apparatuses, and non-transitory computer-readable medium described herein, each of the set of time offset indications include one or more of a time offset start indication, a time offset end indication, a time offset duration indication, and a packet delivery deadline indication.

Some examples of the method, apparatuses, and non-transitory computer-readable medium described herein may further include operations, features, means, or instructions for determining each of the set of time offset indications with respect to a TSN time reference, where the TSN time reference may be one of a set of TSN time references associated with the RAN.

In some examples of the method, apparatuses, and non-transitory computer-readable medium described herein, the set of traffic streams associated with the QoS class of the data flow include aperiodic traffic streams, periodic traffic streams, or a combination thereof.

Some examples of the method, apparatuses, and non-transitory computer-readable medium described herein may further include operations, features, means, or instructions for including the timing information with configuration information for the data flow, where the configuration information may be included in one or more of a QoS profile associated with the data flow, one or more QoS rules associated with the data flow, or one or more PDRs associated with the data flow.

Some examples of the method, apparatuses, and non-transitory computer-readable medium described herein may further include operations, features, means, or instructions for providing at least a portion of the data flow via communications between the set of downlink endpoints and a set of corresponding uplink endpoints, based on the timing information.

In some examples of the method, apparatuses, and non-transitory computer-readable medium described herein, receiving timing information for the data flow further may include operations, features, means, or instructions for receiving a first system message from a network function associated with the first node; or, receiving a second system message from a different node in the RAN; or, and a combination thereof.

In some examples of the method, apparatuses, and non-transitory computer-readable medium described herein, establishing the data flow may include operations, features, means, or instructions for receiving a handover message from a second node in the RAN, where the handover message indicates that the data flow may be to be handed over from the second node to the first node; or, and receiving a handover message from a network function associated with the RAN that an aspect related to the data flow may be to be handed over from the network function to a different network function.

In some examples of the method, apparatuses, and non-transitory computer-readable medium described herein, the first node of the RAN may be a base station or a UPF associated with the RAN. In some examples of the method, apparatus, and non-transitory computer readable medium described herein, the UE communicates with a set of downstream endpoints via the plurality of traffic streams.

Some examples of the method, apparatuses, and non-transitory computer-readable medium described herein may further include operations, features, means, or instructions for determining the timing information based on a timing configuration for the data flow, where the timing information may be provided by one or more of, subscription information associated with the UE stored in one or more of a UDR, an AUSF, or a HSS, and preconfigured information provided by a network function or a RAN node.

DETAILED DESCRIPTION

Figure 1:
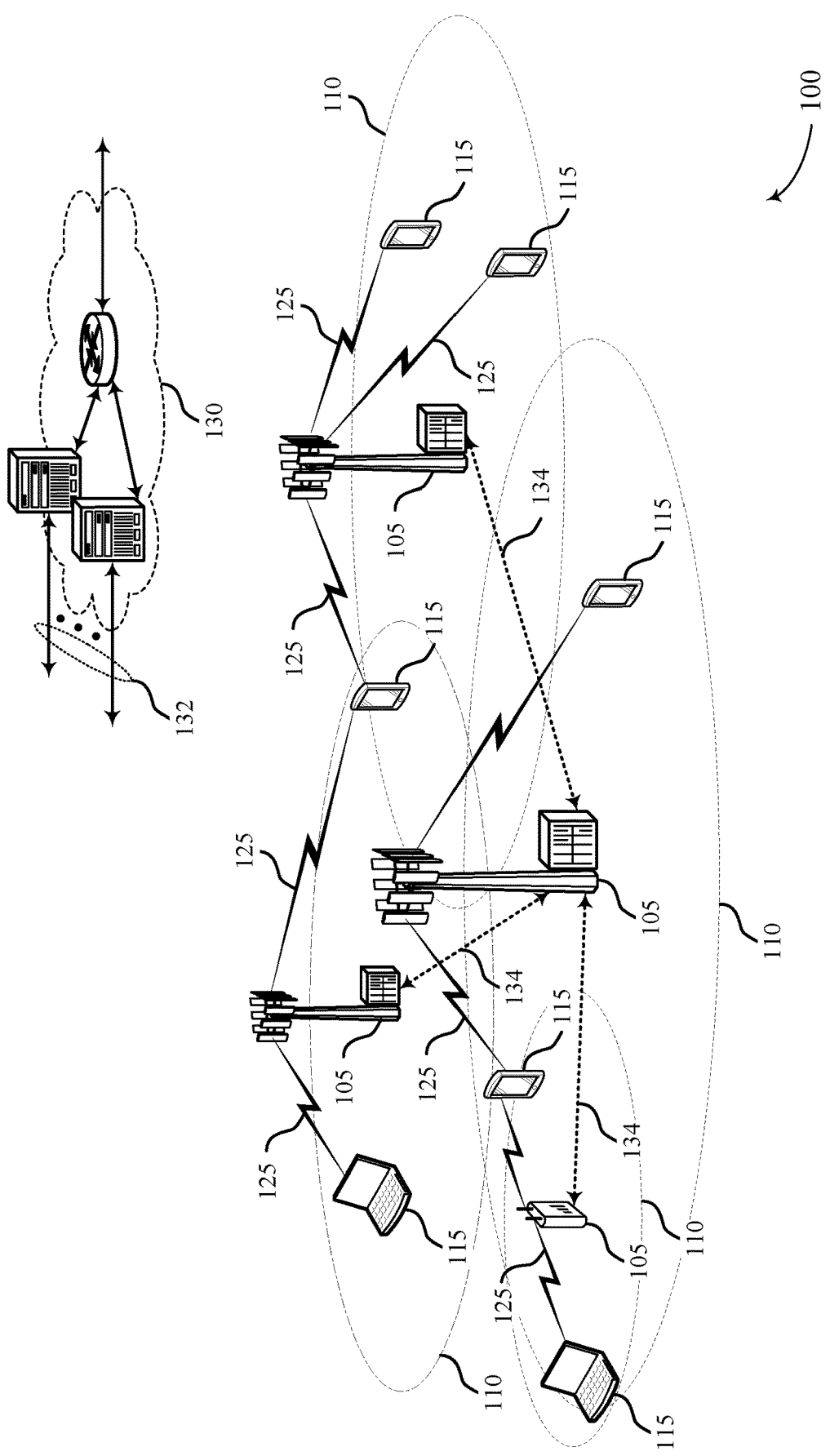
FIG. 1 illustrates an example of a system for wireless communications that supports timing information for multiple periodic traffic streams sharing a same quality of service in accordance with aspects of the present disclosure.

Some wireless communications systems may be used to facilitate communications in networks that rely on relatively strict timing synchronization of network components, sometimes referred to as time sensitive networking (TSN) systems. Such systems may be used to support, for example, factory automation. Some TSN systems specify relatively stringent quality of service (QoS) parameters, such as latency, jitter and reliability requirements for data traffic (e.g., less than 1 ms latency and a 10' packet loss ratio or better). In some cases, such data traffic may be supported in a wireless communications system using a high reliability service, such as an ultra-reliable low latency communication (URLLC) service.

Various aspects of the present disclosure provide for timing synchronization among a set of TSN endpoints via a wireless communications network. In some cases, a data flow may be established via the wireless communications network, in which one or more system messages associated with the data flow may provide timing information for the data flow. In some cases, a first node within the wireless communications network (e.g., a base station or gNB, a central unit, or a user plane function (UPF) associated with the wireless communications network) may receive a request for establishing such a data flow with a user equipment (UE), where the UE may provide communication with a set of downstream TSN endpoint nodes via the first node. In some cases, the data flow may be associated with a traffic or QoS class, and the UE may communicate with a set of downstream endpoints via respective traffic streams. In some cases, each traffic stream may be between a downstream and an upstream end point via both the UE and the first node of the RAN. In some cases, the each of the TSN traffic streams forming the TSN traffic for a particular QoS flow may be characterized by a period and an offset. Thus, in some aspects, one or more TSN traffic streams (e.g., periodic or aperiodic traffic streams) may be mapped to the same QoS flow.

In some circumstances, there may be no mechanism to distinguish between the different traffic streams for a particular QoS flow, for example, due to an absence of stream specific packet filters. Thus, in some cases, there may exist a temporal pattern of traffic for the QoS flow. In one example, for a wireless communication system (e.g., a 5G system (5GS)) establishing a QoS flow based on an IEEE 802.1 Qbv configuration (e.g., from a centralized network configuration of a TSN system), the configuration may be sent using IEEE8021-ST-MIB. In this example, the configuration may be associated with a traffic class (e.g., traffic class 5), which may comprise of multiple TSN traffic streams with different periodicities. Thus, in some aspects, the QoS flows associated with TSN traffic may include one or more periodic components.

In some cases, the first node may receive timing information for the data flow via one or more system messages associated with the data flow, and establish the data flow based at least in part on the timing information. In some cases, the timing information may be provided by one or more of a TSN adaptation function, an access and mobility management function (AMF), a user plane function (UPF), a session management function (SMF), a policy control function (PCF), an application function, or any combinations thereof. In some cases, the timing information may be included with configuration information for the data flow, and the configuration information may be included in one or more of a quality of service (QoS) profile associated with the data flow, one or more QoS rules associated with the data flow, or one or more packet detection rules (PDRs) associated with the data flow.

In some cases, the first node or a first network function may establish the data flow based on receiving a handover message from a different node or network function, indicating that the data flow is to be handed over from a different node to the first node or first network function. In some cases, the first node or first network function may receive a handover message from a different node or network function that indicates that an aspect related to the data flow is to be handed over from the first node or first network function to another node or network functions. In some cases, the aspect related to the data flow may include one or more of communicating the data flow (e.g., communicating TSN data associated with the data flow based on the handover message), communicating control or configuration information related to the data flow (e.g., communicating one or more system messages with control or configuration information), or communicating a status information related to the data flow.

In some aspects, a network function associated with a wireless communications system may perform various timing-related functions associated with a data flow of a TSN system. In some cases, the data flow may be established in part via a first node associated with a radio access network (RAN), and the network function may receive timing information for the data flow via one or more system messages associated with the data flow. Such timing information may be associated with a TSN and at least one TSN adaptation function associated with the RAN. The network function may relay the timing information to one or more other nodes associated with the RAN to provide at least a portion of the data flow and thereby facilitate communications among a set of TSN endpoints.

In some cases, the QoS for a QoS flow may comprise of a QoS parameter set component of traffic mapped to the QoS flow, where the QoS parameter set for a periodic component may include a traffic direction (i.e., uplink or downlink), a periodicity, an offset, a bit rate, or a combination thereof. In some cases, receiving the timing information or the QoS parameter set for the periodic component may also include receiving a packet data budget (PDB) parameter, a packet error loss rate (PER) parameter, or one or more packet size parameters associated with one or more of the traffic streams associated with the QoS class of the data flow. In some cases, the QoS parameter associated with a periodic component may be used by the RAN for one or more of a determination of an SPS configuration or a Configured Scheduling (CS) configuration for the UE. Additionally or alternatively, the QoS parameter set may be used by the RAN for determining whether to establish or accept a change to the QoS flow. In some other cases, the QoS parameter set may be used by the UPF for determining whether to establish or change the QoS flow.

Such techniques may provide timing information in a TSN system, and may allow for time aware scheduling for communications within the wireless communications system and with different TSN endpoints (e.g., upstream and/or downstream endpoints). Thus, for a given TSN flow, the wireless communications network may perform scheduling for the TSN flow (e.g., scheduling of uplink and downlink transmissions for a UE that is coupled with a TSN endpoint) based on timing characteristics of the TSN flow. For instance, this can be used to configure semi-persistent scheduling (SPS) or configured scheduling (CS) for one or more UEs.

Particular aspects of the subject matter described herein may be implemented to realize one or more advantages. The described techniques may support improvements for maintaining time synchronization between TSN endpoints, decreasing signaling overhead, and improving reliability, among other advantages. As such, supported techniques may include improved network operations and, in some examples, may promote network efficiencies, among other benefits.

Aspects of the disclosure are initially described in the context of a wireless communications system. Aspects of the disclosure are further illustrated by and described with reference to data flows, admission control diagrams, apparatus diagrams, system diagrams, and flowcharts that relate to signaling timing information for multiple periodic traffic streams sharing a same quality of service.

FIG. 1 illustrates an example of a wireless communications system 100 that supports timing information for multiple periodic traffic streams sharing a same quality of service in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands (e.g., in the range of 300 MHz to 300 GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may contain one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may contain one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects of the present disclosure, one or more UEs 115 or other network devices may be coupled with one or more TSN endpoints (e.g., upstream and/or downstream TSN endpoints). Timing synchronization among a set of TSN endpoints in communication with each other via wireless communications network 100 may be provided by establishing a QoS flow via a portion of the wireless communications network 100 that carries TSN data. In some cases, timing information for the QoS flow associated with a TSN flow carried via a UE 115 may be sent from a TSN adaptation function associated with the wireless communications system 100 to one of a RAN node associated with the UE 115, the UE 115 or a UPF associated with the UE 115 using one or more system messages associated with the QoS flow. Such techniques may provide timing information in a TSN system, and may allow for time aware scheduling for communications among two or more nodes within the wireless communications system 100 and with different TSN endpoints. The RAN node may be a base station, a gNB, a cell, an ng-eNB, an eNB, a CU, or a DU. The RAN node may be one node of a RAN that comprises one or more of a plurality of base stations, a plurality of gNBs, a plurality of cells, a plurality of ng-eNBs, a plurality of eNBs, a plurality of CUs or a plurality of DUs.

In some cases, one or more of the base stations 105 may be a first node in the wireless communications system 100 and may include a communications manager 101, which may receive a request for establishing a data flow with a UE 115, where the UE 115 may provide communication with a set of TSN endpoints node via the first node. In some cases, the TSN endpoints may be upstream (i.e., upstream of the first node or the UE 115) or downstream from the UE 115. The first node may receive timing information for the data flow via one or more system messages associated with the data flow, and establish the data flow based at least in part on the timing information. In some cases, the timing information may be provided by one or more of a TSN adaptation function, an access and mobility management function (AMF), a user plane function (UPF), a session management function (SMF), a policy control function (PCF), an application function, or any combinations thereof. In some cases, the timing information may be included with configuration information for the data flow, and the configuration information may be included in one or more of a QoS profile associated with the data flow, one or more QoS rules associated with the data flow, or one or more PDRs associated with the data flow.

In some cases, one or more device within the wireless communications system 100 may include a network function 102. In the example of FIG. 1, the network function 102 is illustrated as being associated with the core network 130, and such a network function 102 may be part of the core network 130 or a separate device that is associated with the wireless communications system 100 (e.g., a programmable logic controller (PLC) that runs a TSN adaptation function). The network function 102 may perform various timing-related functions associated with a data flow of a TSN system. In some cases, the data flow may be established via a first node (e.g., a base station 105), and the network function 102 may receive timing information for the data flow via one or more system messages associated with the data flow. Such timing information may be associated with a TSN and at least one TSN adaptation function associated with the wireless communications network 100. The network function 102 may relay the timing information to one or more other nodes to provide at least a portion of the data flow and thereby facilitate communications among a set of TSN endpoints.

In some cases, the timing information may be based at least in part on a plurality of traffic streams associated with the QoS class (i.e., traffic class) of the data flow. It should be noted that the timing information may be based on a period and an offset for each of the traffic streams associated with the QoS class of the data flow. In some aspects, the knowledge of period and/or offsets may serve to optimize configuration of SPS and CS, since the RAN may resort to utilizing dynamic grants for scheduling transmission of one or more TSN traffic packets due to absence of period/offset information. In some cases, this may lead to increased overhead (e.g., amount of PDCCH resources required), and limit the capacity (i.e., number of supported UEs or TSN endpoints) of the network. Thus, utilizing timing information based on one or more time offset and periods may limit the amount of downlink control channel (e.g., Physical Downlink Control Channel (PDCCH)) resources required for scheduling in the RAN, and may also facilitate communications amongst the set of upstream and downstream TSN endpoints.

Figure 2:
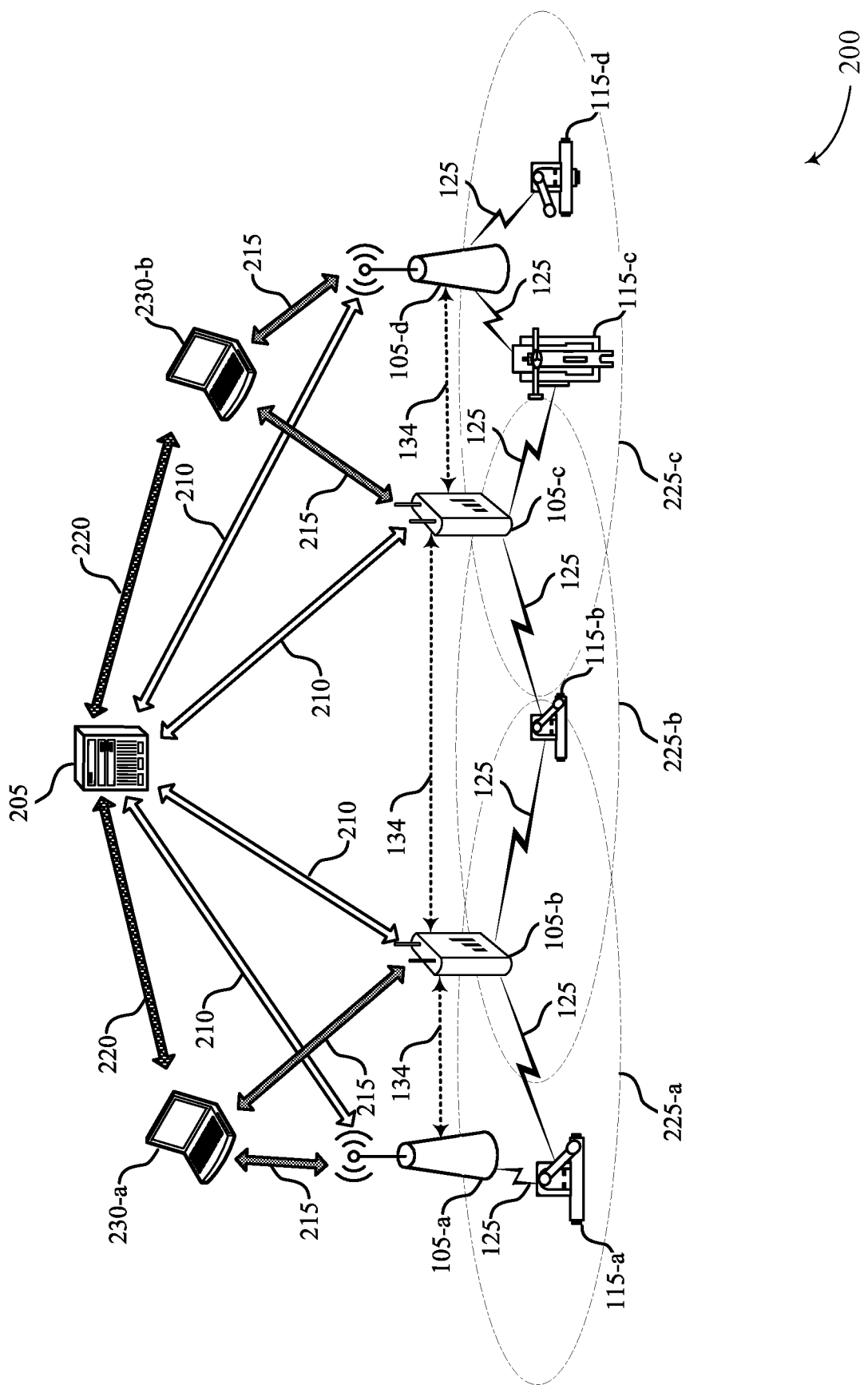
FIG. 2 illustrates an example of a portion of a wireless communications system that supports signaling timing information for multiple periodic traffic streams sharing a same quality of service in accordance with aspects of the present disclosure.

FIG. 2 illustrates an example of a portion of a wireless communications system 200 that supports signaling timing information for multiple periodic traffic streams sharing a same quality of service in accordance with aspects of the present disclosure. In some examples, wireless communications system 200 may implement aspects of wireless communications system 100. In wireless communications system 200, a network function 205 (e.g., a grand master TSN function, a multicell/multicast coordination entity (MCE), a node within the core network 130, a TSN adaptation function, etc.) may facilitate the exchange of timing information associated with a QoS flow that provides a TSN data flow between two or more devices within the wireless communications system 200. In some cases, the two or more devices may comprise a downstream endpoint and an upstream endpoint. Further, the TSN data flow may be associated with a QoS class, and a UE 115 may communicate with a set of downstream endpoints via respective traffic streams, the traffic streams being between the downstream and upstream end point via both the UE and a RAN node. In some cases, the wireless communications system 200 may be located in an industrial setting, and each of the UEs 115 may be associated with a piece of equipment that may be a TSN endpoint within the industrial setting, although techniques provided herein may be used in any on a number of other deployment scenarios. In some cases, a number of different network functions 205 may be provided on a number of different nodes within the wireless communications system 200.

In the example of FIG. 2, a number of coverage areas 225 may each include multiple TRPs 105 capable of communicating with one or more UEs 115 within the coverage area 225. The TRPs 105 may be any one of a base station, an eNB, a gNB, an IoT gateway, a cell, etc. The TRPs 105 may communicate with a management system (e.g., a network function 205) via links 210. The management system may include, for example, an industrial PC which may provide controller programming for TSN endpoints that may be associated with different UEs 115, software and security management of the wireless communications system 200, long term key performance indicator (KPI) monitoring, among other functions. In some cases, the management system may include a TSN grandmaster clock that is used for synchronizing one or more network nodes or TSN endpoints.

In the example of FIG. 2, the TRPs 105 may also communicate with human-machine-interfaces (HMIs) 230 via communications links 215 and HMIs 230 may communicate with network function 205 (or other management system) via links 220. HMIs 230 may include, for example, tablet computers, control panels, wearable devices, control computers, and the like, which may provide control for different equipment within the system (e.g., start/stop control, mode change control, augmented or virtual reality control, etc., for a piece of equipment that may include a TSN endpoint and UE 115).

In some cases, one or more programmable logic controllers (PLCs) may be associated with one or more TRPs 105 and may issue a series of commands (e.g., motion commands for a piece of equipment), receive sensor inputs (e.g., position of a robotic arm of a piece of equipment), and coordinate with other PLCs. In such cases, the wireless communications between the TRPs 105, UEs 115, HMIs 230, network function 205, and/or one or more other network functions or nodes may provide near real-time information as part of a TSN. In some cases, wireless communications system 200 may provide for TSN data flows and for timing synchronization among a set of TSN endpoints.

In some cases, a data flow may be established via the wireless communications system 200, in which one or more system messages associated with the data flow may provide timing information for the data flow. Such a data flow may include or be associated with, for example, one or more QoS flows, one or more protocol data units (PDUs), one or more radio bearers, one or more radio link control (RLC) channels, one or more logical channels, one or more transport channels, or any combinations thereof. Additionally, the one or more system messages may include one or more network access stratum (NAS) messages, one or more access stratum (AS) messages, one or more messages exchanged between two network functions in the wireless communications system 200, one or more messages exchanged between two entities in the wireless communications system 200, or any combinations thereof.

Figure 3:
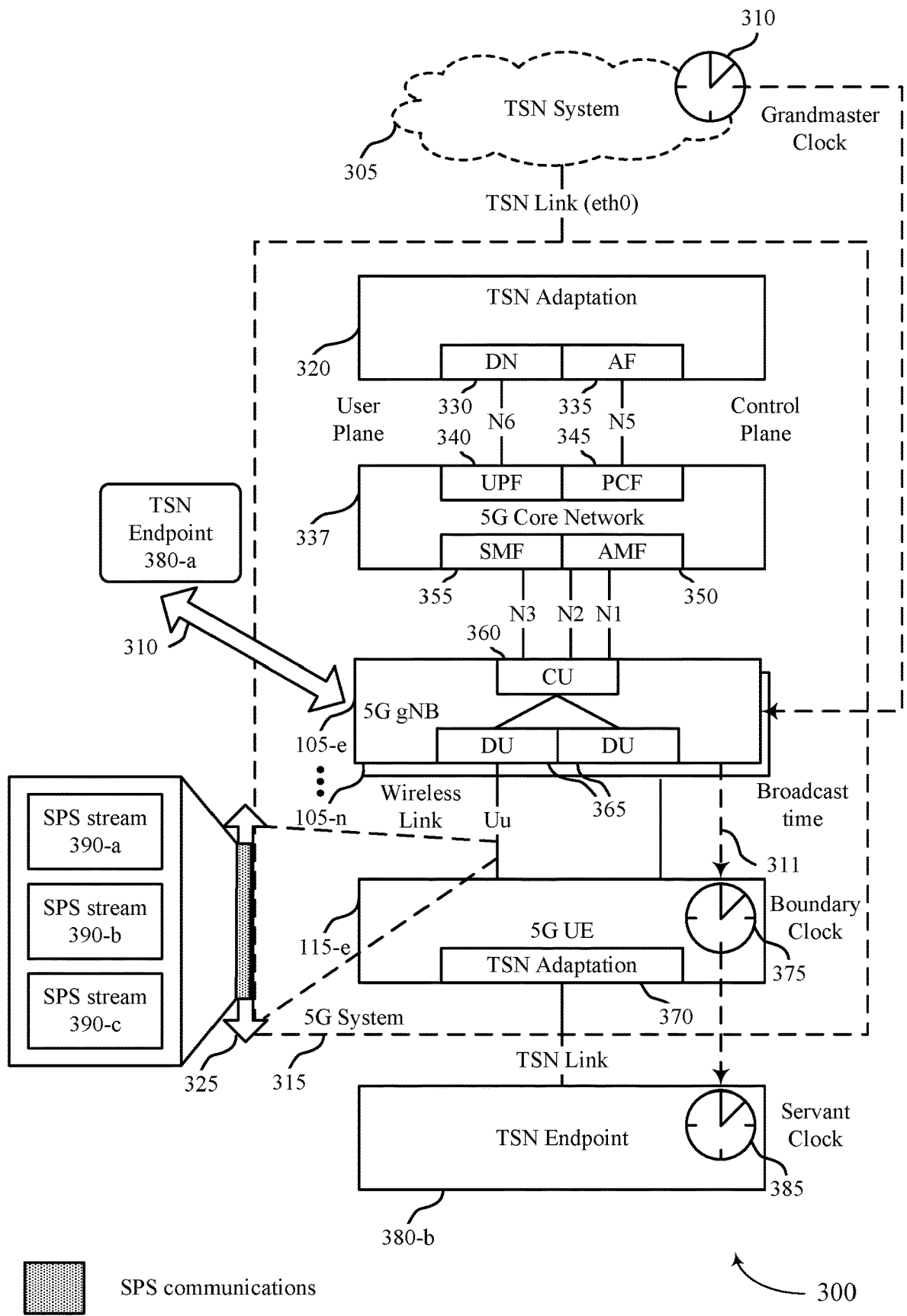
FIG. 3 illustrates an example of a wireless communications system that supports signaling timing information for multiple periodic traffic streams sharing a same quality of service in accordance with aspects of the present disclosure.

FIG. 3 illustrates an example of wireless communications system 300 that supports signaling timing information for multiple periodic traffic streams sharing a same quality of service in accordance with aspects of the present disclosure. In some examples, wireless communications system 300 may implement aspects of wireless communications system 100 or 200. In this example, a TSN system 305 may include a grandmaster clock 310 and may be coupled with a RAN 315 (e.g., a 5G or NR RAN) that may include a number of network functions and network nodes.

In the example of FIG. 3, the RAN 315 may include a TSN adaptation function 320 that may provide an interface between the RAN 315 and the TSN system 305 (e.g., via a TSN link (eth0)). The TSN adaptation function 320 may include a data network (DN) function 330 and an application function (AF) 335. RAN 315 also may include a core network 337, a number of base stations 105-*e* through 105-*n*, and one or more UEs 115-*e*. In this example, core network 337 may include a user plane function (UPF) 340, a policy control function (PCF) 345, an access and mobility management function (AMF) 350, and a session management function (SMF) 355. In this example, DN function 330 and UPF 340 may exchange user plane data via interface N6, and AF 335 and PCF 345 may exchange control plane data via interface N5. One or more of the base stations 105 may include a central unit (CU) 360, and multiple distributed units (DUs) 365. Backhaul links N1, N2, and N3, may connect the CU 360 with SMF 355 and AMF 350. In some cases, UE 115-*e* may have a wireless link Uu 325 with a DU 365, and may have a UE TSN adaptation function 370 that provides an interface with one or more TSN endpoint(s) 380 via a TSN link.

In some cases, upstream TSN endpoint 380-*a* may communicate with downstream TSN endpoint 380-*b* using one or more SPS streams 390 (e.g., SPS stream 390-*a*, SPS stream 390-*b*, and SPS stream 390-*c*). In some cases, the periodic transmissions made in accordance with an SPS stream 390 may be referred to as a set of SPS transmissions. Each of the SPS streams 390 may be transmitted from the TSN endpoint 380-*a* to TSN endpoint 380-*b* via base station 105 (e.g., base station 105-*e*) and UE 115-*e*. In some cases, the base station 105 may receive the transmission of SPS streams from TSN endpoint 380-*a* via connection 310, and may further transmit the downlink transmission of SPS streams to the UE 115 via wireless link 325. Further, the UE 115-*e* may in turn transmit the downlink transmissions of SPS streams 390 to the TSN endpoint 380-*b* via another connection (i.e., TSN link), which may be wired or wireless.

In this example, one or more of the base stations 105 may receive timing information from grandmaster clock 310, which may be provided by one or more system messages between the TSN adaptation function 320 and CU 360, for example. In some cases, the UE 115-*e* may receive timing information from base station 105-*e*, and may establish a boundary clock 375 that is synchronized with a servant clock 385 at the TSN endpoint 380-*b*. In some cases, the UE 115-*e* may be incorporated as part of TSN endpoint 380-*b*. In other cases, the UE 115-*e* may not be incorporated as part of a TSN endpoint, and may carry data between two TSN endpoints (i.e., TSN endpoints 380-*a* and 380-*b*). Thus, a data flow may be established in the RAN 315 between TSN system 305 and TSN endpoint 380-*b* (e.g., a sensor/actuator (S/A) device). In some cases, the TSN system 305 may include a controller, such as a PLC, such that the data flow is provided between two TSN endpoints (e.g., PLC, such as TSN endpoint 380-*a*, and S/A, such as TSN endpoint 380-*b*).

In some circumstances, the data flow may be associated with a QoS class, where the UE 115-*e* may communicate with downstream endpoint 380-*b* via respective traffic streams (i.e., SPS streams 390). As illustrated, the SPS traffic streams 320 may be between the upstream and downstream TSN endpoints via both the UE 115-*e* and base station 105-*e* (e.g., a first node of the RAN).

In some cases, timing information associated with the data flow may provide for synchronization of the boundary clock 375, the servant clock 385, and the grandmaster clock 310. Such timing information, as discussed above, may be provided via one or more system messages. In some cases, the system messages may include one or more messages amongst a first set of network functions, one or messages between a second set of network functions and a RAN, or one or messages amongst a third set of network functions and the UE 115. In some cases, the first, second and third set of network functions may comprise of one or more of a plurality of AMFs 350, a plurality of UPFs 340, a plurality of SMFs 355, a plurality of PCFs 345, a plurality of AFs 335, or any combinations thereof. For example, system messages may include a message from AF 335 to a PCF 345, a message from PCF 345 to SMF 355, a message from SMF 355 to AMF 350, and a message from AMF 350 to base station 105-*e* (and/or one or more other base stations 105) or the RAN. In other examples, the system messages may include a message from AF 335 to PCF 345, a message from PCF 345 to AMF 350, and a message from AMF 350 to UE 115-*e* (via a base station 105 or the RAN).

The timing information provided by the system messages, as indicated above, may allow for timing synchronization between TSN endpoints 380. In some cases, the timing information for the data flow comprises receiving a plurality of time offset indications associated with communicating with the one or more downstream TSN endpoints. Additionally, in some cases, the timing information may include one or more of traffic periodicity, traffic direction (i.e., upstream or downstream), a packet data budget parameter (PDB) parameter, a packet error loss rate parameter (PER), a burst size parameter, or one or more packet size parameters associated with the one or more traffic streams associated with the QoS class of the data flow. Traffic periodicity may be, for example, a periodicity of generation of packets by a TSN endpoint 380 and/or a different TSN endpoint within the TSN system 305. In some cases, the time offset information may include one or more time offset pairs, which may correspond to paired direction parameters (e.g., uplink/downlink, PLC-to-S/A or S/A-to-PLC, etc.). In some cases, the received timing information for the data flow may comprise a time offset associated with TSN endpoint 380-$b$ for one or more traffic streams (e.g., SPS stream 390-$a$) of the plurality of SPS streams 390 associated with the QoS class of the data flow.

In some cases, time offset information may include one or more of a time offset start indication (e.g., a timestamp), a time offset end indication (e.g., a timestamp), a time offset duration indication (e.g., a time duration), or a packet delivery deadline indication. In some examples, the packet delivery deadline may indicate a deadline time by which a packet associated with the data flow has to be sent by the UE or delivered to the UE. The packet delivery deadline may be determined, in some examples, based on $n$*Periodicity+Offset+latency_tolerence, for an integer n where the parameters Periodicity, Offset and latency_tolerance may be provided in one or more system information messages. In some cases, the time offset information may have a granularity of milliseconds, microseconds or nanoseconds.

In some cases, the time offset indication may be determined with respect to a TSN time reference (e.g., with respect to grandmaster clock 310, boundary clock 375, or servant clock 385). For example, the time offset indication may specify arrival of packets 'n' at time t=n*Periodicity+Offset, wherein the reference for the time 't' is the TSN time reference. In some examples, there may be a plurality of TSN time references associated with the RAN.

In some cases, the timing information may be included in configuration information for the QoS flow contained in the system messages. For example, the configuration information may be included in one or more of a QoS profile associated with the QoS flow (e.g., a modified version of a profile defined in 3GPP TS 23.501), one or more QoS rules (e.g., a modified version of QoS rules defined in 3GPP TS 23.501), one or more uplink or downlink Packet Detection Rules (PDRs), or any combinations thereof. In some cases, the timing information may be provided by one or more of the TSN adaptation function 320; subscription information associated with the UE 115-$e$ stored in one or more of a unified data repository (UDR), an authentication server function (AUSF), or a home subscriber server (HSS); or preconfigured information provided by a network function or a RAN node (e.g., information such as backhaul capacity of various wireline links in the RAN 315 that may be used to determine the time taken by a data packet to traverse from the TSN adaptation function 320 to a base station 105). In some cases, the timing information that is received from the TSN adaptation function 320 may be used at a base station 105, the core network 337, or both, to determine scheduling patterns for the UE 115-$e$, and one or more other UEs (e.g., using SPS/CS). Additionally or alternatively, the timing information may be used to provide admission control for the RAN, or UE 115-$e$ (amongst other UEs).

Figure 4:
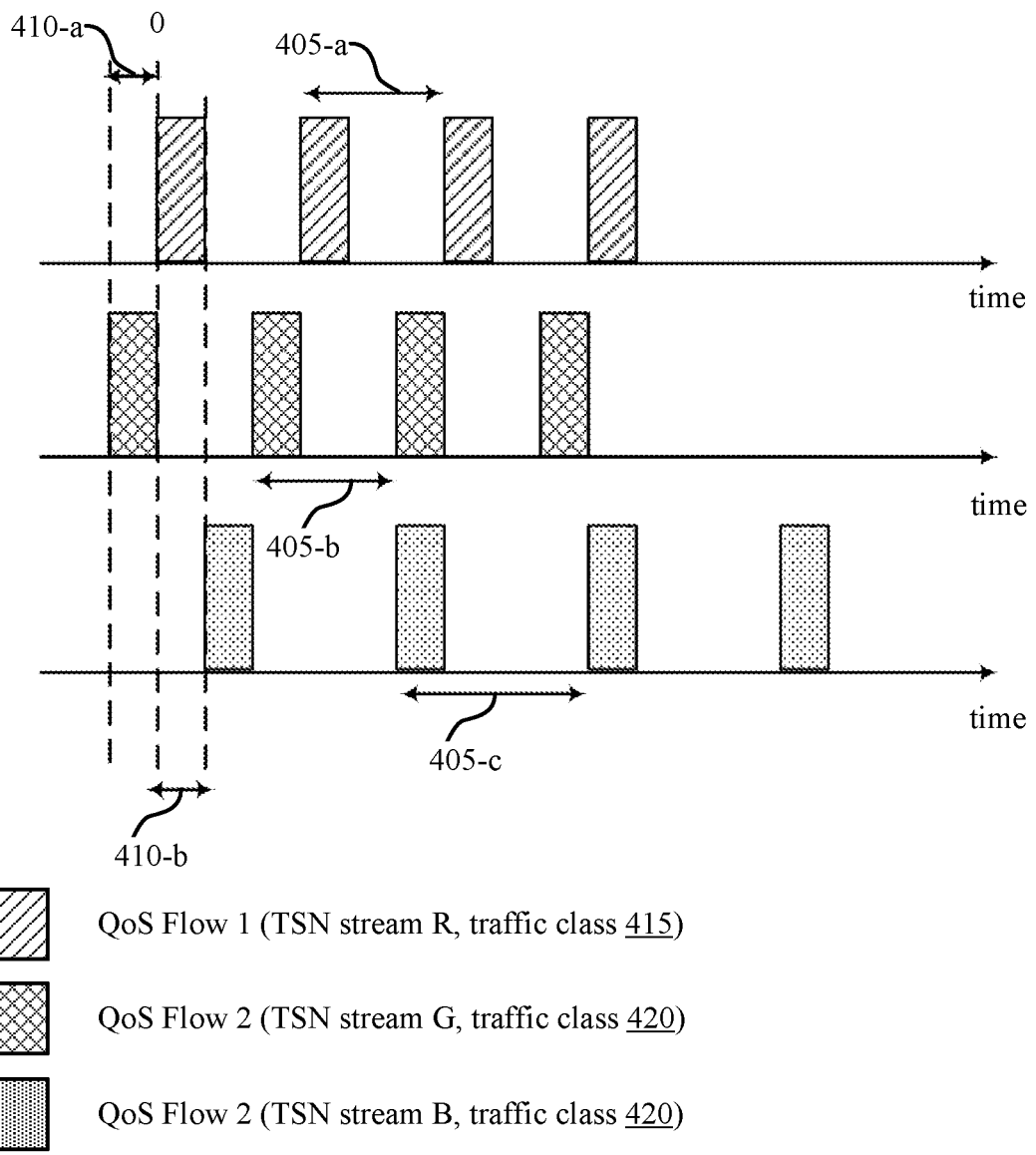
FIG. 4 illustrates an example of a data flow in accordance with aspects of the present disclosure.

FIG. 4 illustrates an example of a data flow 400 that support timing information for multiple periodic traffic streams sharing a same quality of service in accordance with aspects of the present disclosure. In some examples, data flow 400 may implement aspects of wireless communications systems 100, 200, and/or 300. In the example of FIG. 4, data flow 400 is comprised of QoS flows 1 and 2. Further, TSN streams R, G, and B may be periodic in nature (i.e., period 405-$a$, period 405-$b$, and period 405-$c$, respectively), and may be composed of packets associated with a traffic class (e.g., traffic class 415 or 420). As illustrated, periodic TSN stream R may thus be mapped to QoS flow 1, while periodic streams G and B may be mapped to QoS flow 2. Thus, in some aspects, the TSN traffic communicated between a downstream TSN endpoint and an upstream TSN endpoint via a UE, a RAN node, such as a base station or UPF, or both, may be comprised of multiple periodic TSN traffic streams. In some cases, one or more of the multiple periodic TSN traffic streams (e.g., TSN stream G, or B) may be characterized by a period and an offset. As illustrated, offset 410-$a$ and offset 410-$b$ for TSN streams G and B, respectively, may be with reference to TSN stream R, and may be the same or different.

In some circumstances, it may be difficult to distinguish between the different traffic streams (e.g., TSN streams G and B) for a particular QoS flow (i.e., QoS flow 2), for example, due to an absence of stream specific packet filters. Thus, in some cases, there may exist a temporal pattern of traffic for QoS Flow 2. In one example, for a wireless communication system (e.g., a 5GS) establishing QoS flow 2, for instance, based on an IEEE 802.1 Qbv configuration from a centralized network configuration of a TSN system, the configuration may be sent using IEEE8021-ST-MIB. In such cases, the configuration may be associated with a single traffic or QoS class (e.g., traffic class 420), comprising the multiple traffic streams.

In some aspects, knowledge of period and/or offset pertaining to the different traffic streams of a QoS flows may optimize SPS and CS configuration by the RAN, for example, by limiting the amount of downlink control channel resources required in the RAN. In some cases, the RAN may need to utilize dynamic grants for scheduling the transmissions of one or more TSN traffic packets associated with a QoS class due to absence of period/offset information, which may impact the number of UEs or TSN endpoints that may be supported by the network, as well as lead to increased overhead (e.g., amount of PDCCH resources required). In some other cases, the presence of period/offset information for the plurality of traffic streams associated with the QoS class of the data flow may limit the impact (e.g., by puncturing) of the TSN traffic transmissions on a non-URLLC transmission. For instance, in some cases, TSN traffic may interrupt or puncture transmissions with lower latency requirements, which may be limited or avoided based on the period and offset information.

Figure 5A:
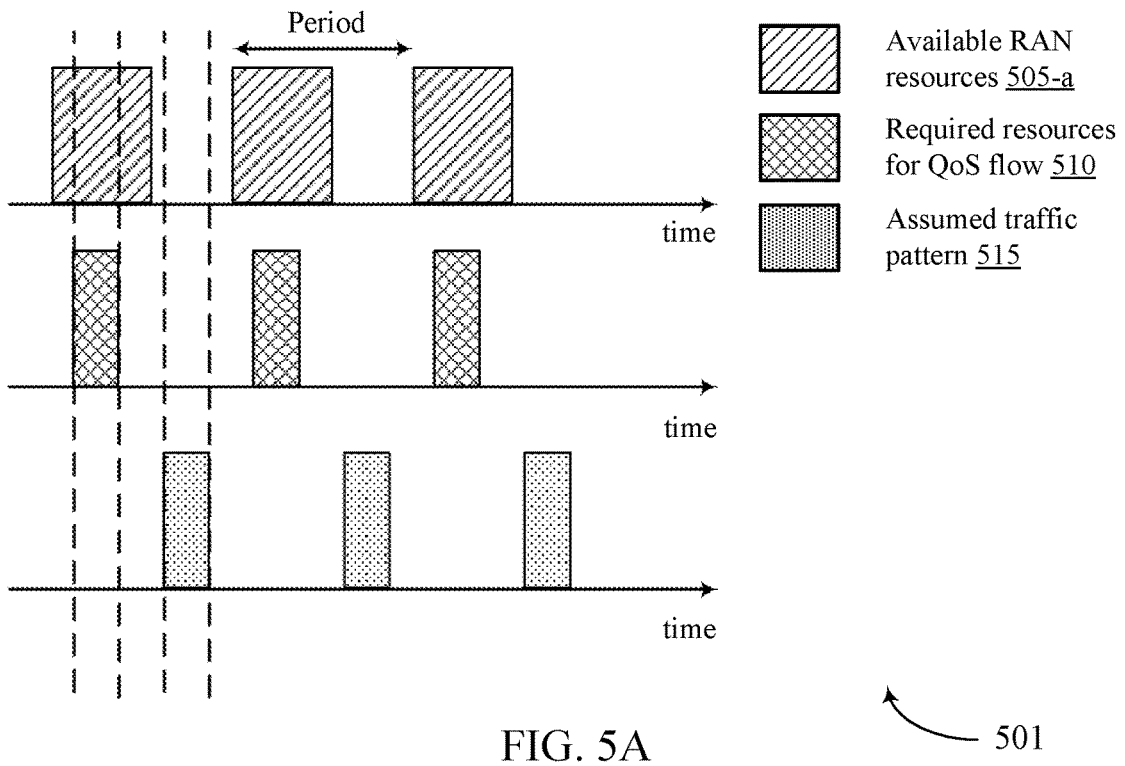
FIGS. 5A and 5B illustrates an example of admission control for multiple periodic traffic streams sharing a same quality of service in accordance with aspects of the present disclosure.
Figure 5B:
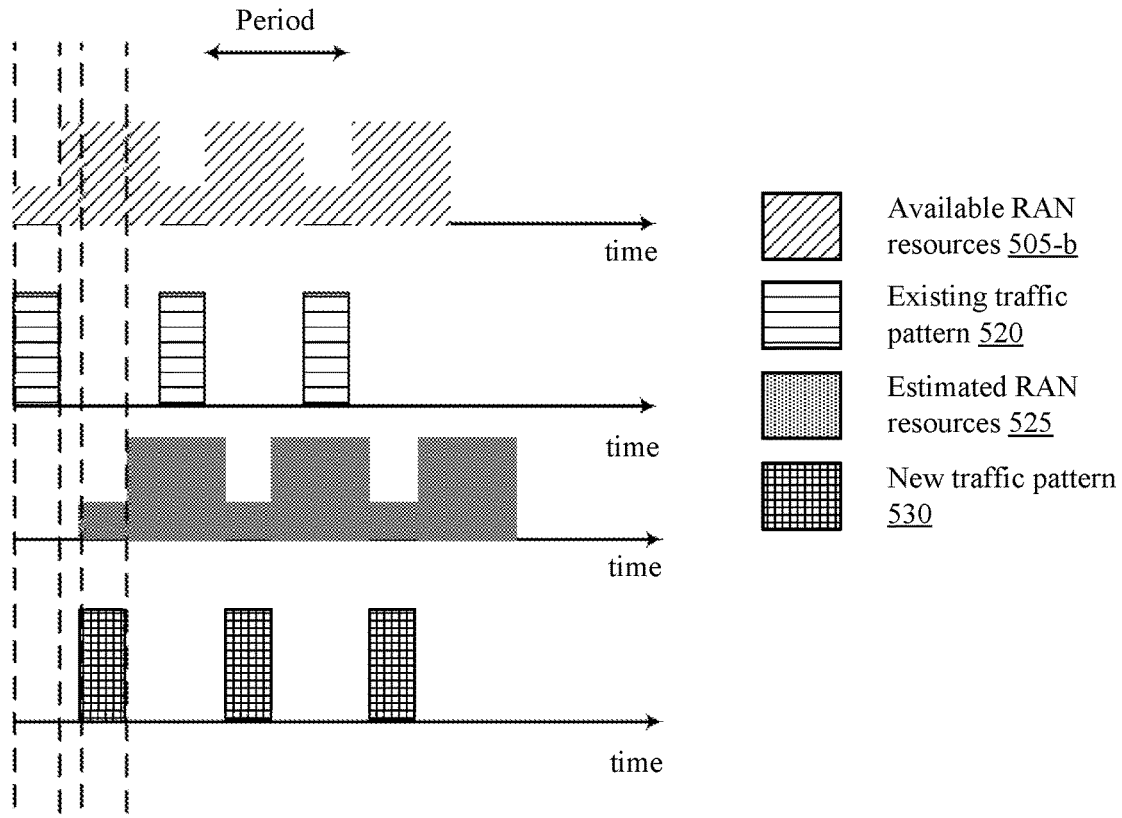

FIGS. 5A and 5B illustrate examples of admission controls 501 and 502 for multiple periodic traffic streams sharing a same quality of service in accordance with aspects of the present disclosure. In some examples, admission controls 500 may implement aspects of wireless communications systems 100, 200, and/or 300.

In some cases, period and/or offset information may be used to optimize admission control in the RAN. In some cases, admission control in a wireless network may be defined as the optimization of radio resource usage while maintaining QoS for existing users. Thus, broadly admission control may be deployed for limiting network congestion. In some cases, admission control decisions may be based on worst case assumptions about traffic offsets, which may be more conservative than required to maintain the required QoS. In some cases, RAN resources may be available periodically, as illustrated by available RAN resources 505-a. In some cases, the admission control for a new periodic component for a QoS flow (i.e., illustrated by required resources for QoS flow 510), may be based on the RAN resource availability. In some circumstances, the traffic for the new periodic component (as illustrated by assumed traffic pattern 515) may be incorrectly assumed to arrive at a time when resource availability in the RAN is low (i.e., below a threshold), for instance, due to lack of knowledge related to the offset. In this case, due to the incorrect assumption, the new periodic component associated with the required resources for QoS flow 510 may not be admitted by the RAN, even though the admission could have been feasible based on the available RAN resources 505-a.

Thus, in some cases, the low resource availability estimate at a time may be based on one or more underlying assumptions, such as, the configuration of uplink resources during the time, or the resource requirements of previously admitted TSN traffic, further described with reference to FIG. 5B.

As illustrated in FIG. 5B, each of available RAN resources 505-b and existing traffic pattern 520 may be characterized by a same or different period. Further, the RAN resource requirement for a new periodic component of the QoS flow, as illustrated by estimated RAN resources 530, may fall within the available RAN resources 505-b. In some cases, however, an incorrect estimate of resource availability (i.e., estimated RAN resources 525) due to lack of period/offset knowledge may lead to the new periodic component not being admitted by the RAN. Thus, knowledge of the period/offset for the different traffic streams of a QoS class may serve to optimize admission control at the RAN and/or the UE.

Figure 6:
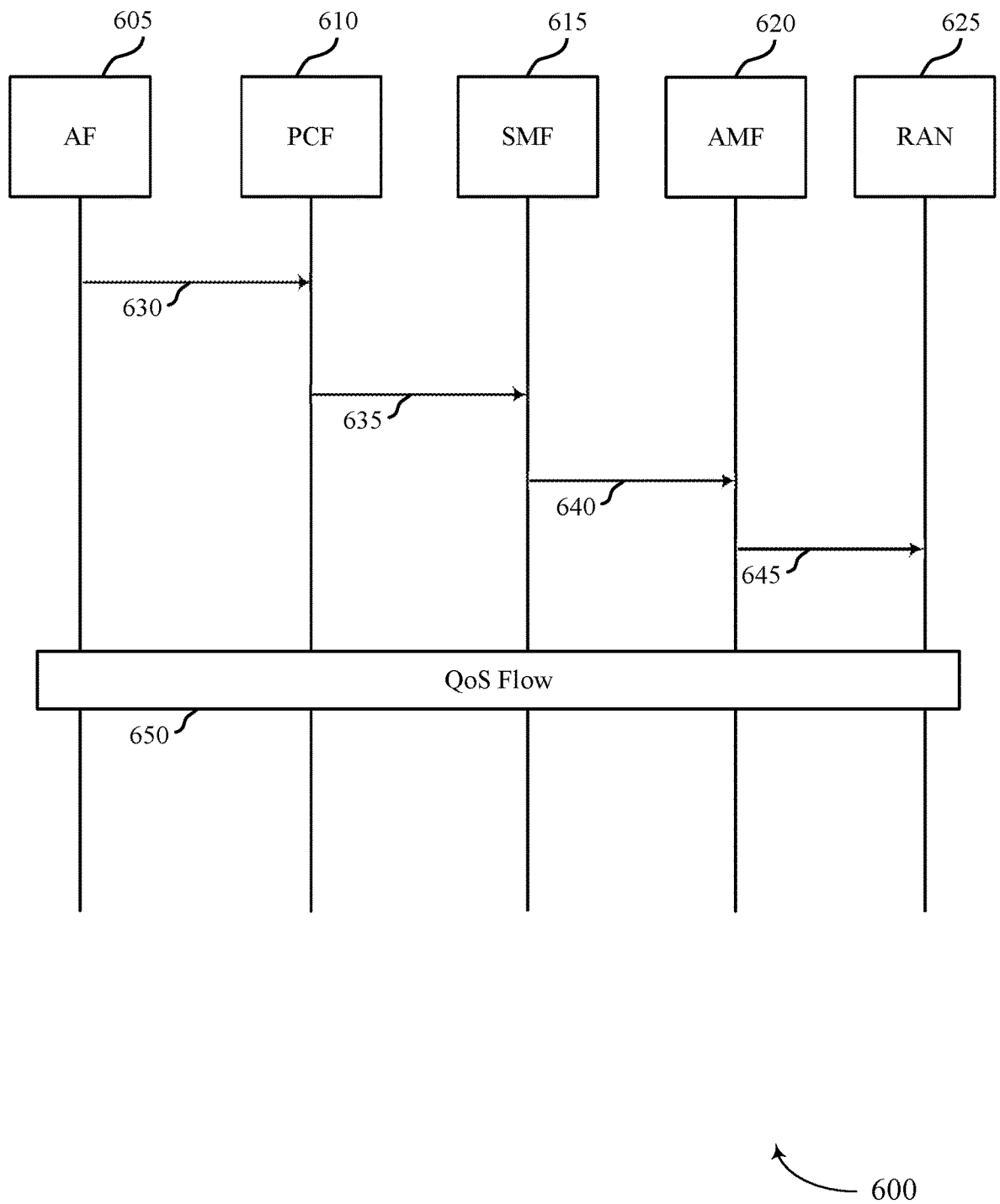
FIG. 6 illustrates an example of a process flow that supports timing information for multiple periodic traffic streams sharing a same quality of service in accordance with aspects of the present disclosure.

FIG. 6 illustrates an example of a process flow 600 that supports timing information for multiple periodic traffic streams sharing a same quality of service in accordance with aspects of the present disclosure. In some examples, process flow 600 may implement aspects of wireless communications system 100, 200, or 300. As shown, process flow 600 may be implemented by an AF 605, PCF 610, SMF 615, AMF 620, and RAN 625, each of which may examples of the corresponding functions or devices described herein.

In this example, the AF 605 (e.g., a TSN adaptation function) may transmit a first system message 630 to PCF 610. Such a system message 630 may provide timing information related to a QoS flow 650 that is to be established. In some cases, the timing information in the first system message 630 may be provided using a policy authorization service (e.g., using a modified version of a 'Npcf_PolicyAuthorization' service such as defined in Rel-15 3GPP TS 29.514). In some cases, the timing information in the first system message 630 may be provided in a data type (e.g., using a modified version of an 'AppSessionContextReqData' data type or a 'AppSessionContextUpdateData' data type as defined in Rel-15 3GPP TS 29.514). In some cases, the timing information in the first system message 630 may be provided using an information element (IE) in a data field (e.g., in an IE that is defined to provide timing information within 'medComponents' as defined in Rel-15 3GPP TS 29.514). In other cases, the timing information in the first system message 630 may be provided using an attribute value pair (AVP) (e.g., in a modified version of a 'Media-Component-Description' AVP or a 'Media-Sub-Component' AVP or another AVP sent using a receive reference point, such as defined in Rel-15 3GPP TS 29.214).

Continuing with the process flow 600 of FIG. 6, the PCF 610 may receive the first system message, and format the timing information into a second system message 635 that is provided to SMF 615. In some cases, the second system message 635 may use an application programming interface (API) that includes one or more rules that define the timing information. For example, the second system message 635 SMF may use a modified form of a Npcf_SMPolicyControl API defined in Rel-15 3GPP TS 29.512 that may include a policy and charging control (PCC) rule that includes the timing information (e.g., the timing information may be contained in a modified form of QoSData data structure within the "refQosData" attribute as defined in Rel-15 3GPP TS 29.512).

The SMF 615 may receive the second system message 635, and format the timing information into a third system message 640 that is provided to AMF 620. In some cases, the third system message 640 may use one or more service operations of a session service, or a QoS profile attribute to provide the timing information. For example, the third message 640 may use a modified form of Nsmf_PDUSession service defined in Rel-15 3GPP TS 29.502 and a modified form of one or more of a 'Create SM Context,' 'Update SM Context,' 'Create,' or 'Update' service operation defined in Rel-15 3GPP TS 29.502 to indicate the timing information. In some cases, the third message may use a modified form of a service operation associated with Namf_PDUSession service discussed in Rel-15 3GPP TS 23.502. Additionally or alternatively, the third system message 640 may use a defined QosFlowProfile attribute included in a QosFlowSetupItem or a QosFlowAddModifyRequestItem to indicate the timing information.

The AMF 620 may receive the third system message 640, and format the timing information into a fourth system message 645 that is provided to RAN 625 (e.g., a base station and UE) to provide the timing information for QoS flow 650. In some cases, the fourth system message 445 may be a modified form of a 'PDU Session Resource Setup Request' for a PDU session associated with the QoS flow (e.g., a modified form of the request as defined in 3GPP TS 38.413). In some cases, the timing information may be included in a defined 'QoS Flow Level QoS Parameters' IE associated with the QoS flow contained in 'PDU Session Resource Setup Request Transfer.' In some cases, the fourth system message 645 may be modified form of a 'PDU Session Resource Modify Request Transfer' for a PDU session associated with the QoS flow, (e.g., a modified form of the request as defined in 3GPP TS 38.413). In some cases, the timing information may be included in a defined 'QoS Flow Level QoS Parameters' IE associated with the QoS flow contained in a 'PDU Session Resource Setup Request Transfer.' The timing information of the fourth system message 645 may be used, for example, by a UE to establish a boundary clock for use in time aware scheduling. In some cases, AF 605, PCF 610, SMF 615 or AMF 620 may not carry any data for the communication between TSN endpoints (i.e., downstream and upstream TSN endpoints) associated with the QoS flow 650, and may carry one or more of a control information, a configuration information or a status information associated with the QoS flow 450.

Figure 7:
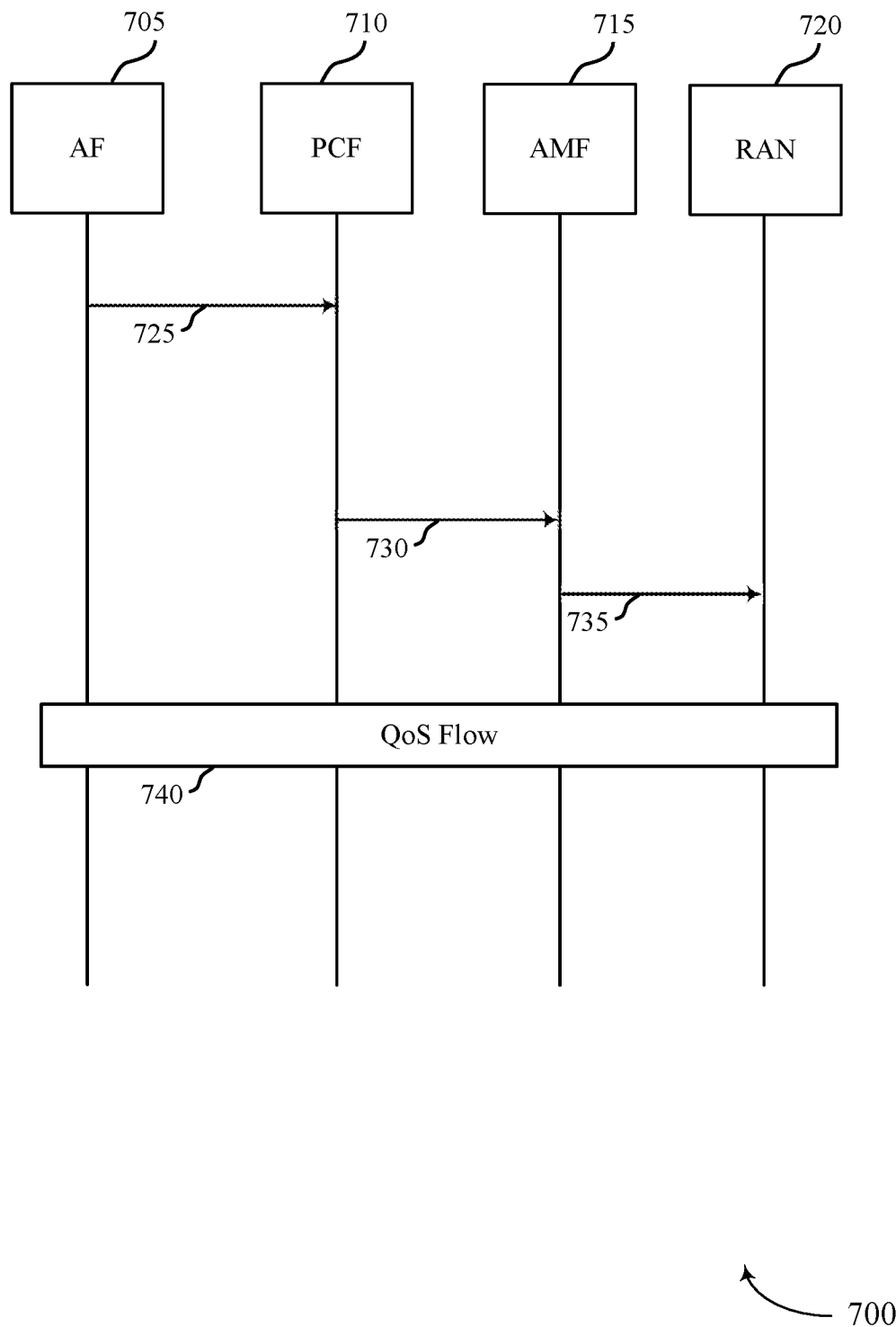
FIG. 7 illustrates an example of a process flow that supports timing information for multiple periodic traffic streams sharing a same quality of service in accordance with aspects of the present disclosure.

FIG. 7 illustrates an example of a process flow 700 that supports timing information for multiple periodic traffic streams sharing a same quality of service in accordance with aspects of the present disclosure. In some examples, process flow 700 may implement aspects of wireless communications system 100, 200, or 300. As shown, process flow 700 may be implemented by an AF 705, PCF 710, AMF 715, and RAN 720, each of which may be examples of the corresponding functions or devices described herein. In some cases, AF 705, PCF 710, or AMF 715 may not carry any data for the communication between TSN endpoints associated with QoS flow 740, and may carry one or more of a control information, a configuration information or a status information associated with the QoS flow 740. In some cases, QoS flow 740 may also be referred to as a data flow associated with a QoS class. Further, a plurality of traffic streams may be associated with the QoS flow 740, where the plurality of traffic streams associated with the QoS class of the data flow may be aperiodic, periodic, or a combination. Further, each traffic stream may be characterized by a period and an offset. In some aspects, each traffic stream may be communicated between a downstream and an upstream TSN endpoint via both a UE and a node of RAN 720, such as a base station.

In this example, the AF 705 (e.g., a TSN adaptation function) may transmit a first system message 725 to PCF 710. Such a first system message 725 may provide timing information related to QoS flow 740 that is to be established. In some cases, the timing information in the first system message 725 may be provided using a policy authorization service, similarly as discussed above with respect to FIG. 4.

The PCF 710 may receive the first system message 725, and format the timing information into a second system message 730 that is provided to AMF 715. In some cases, the second system message 730 may use an API that includes one or more rules that define the timing information, similarly as discussed above with respect to FIG. 4.

The AMF 715 may receive the second system message 730, and format the timing information into a third system message 735 that is provided to the RAN 720 (or a node in the RAN). The AMF 715 may provide the third system message 735 to the RAN 720, for example, via a logical channel that is established between the AMF 715 and the RAN 720. The timing information of the third system message 735 may be used, for example, to establish a boundary clock for use in time aware scheduling.

Figure 8:
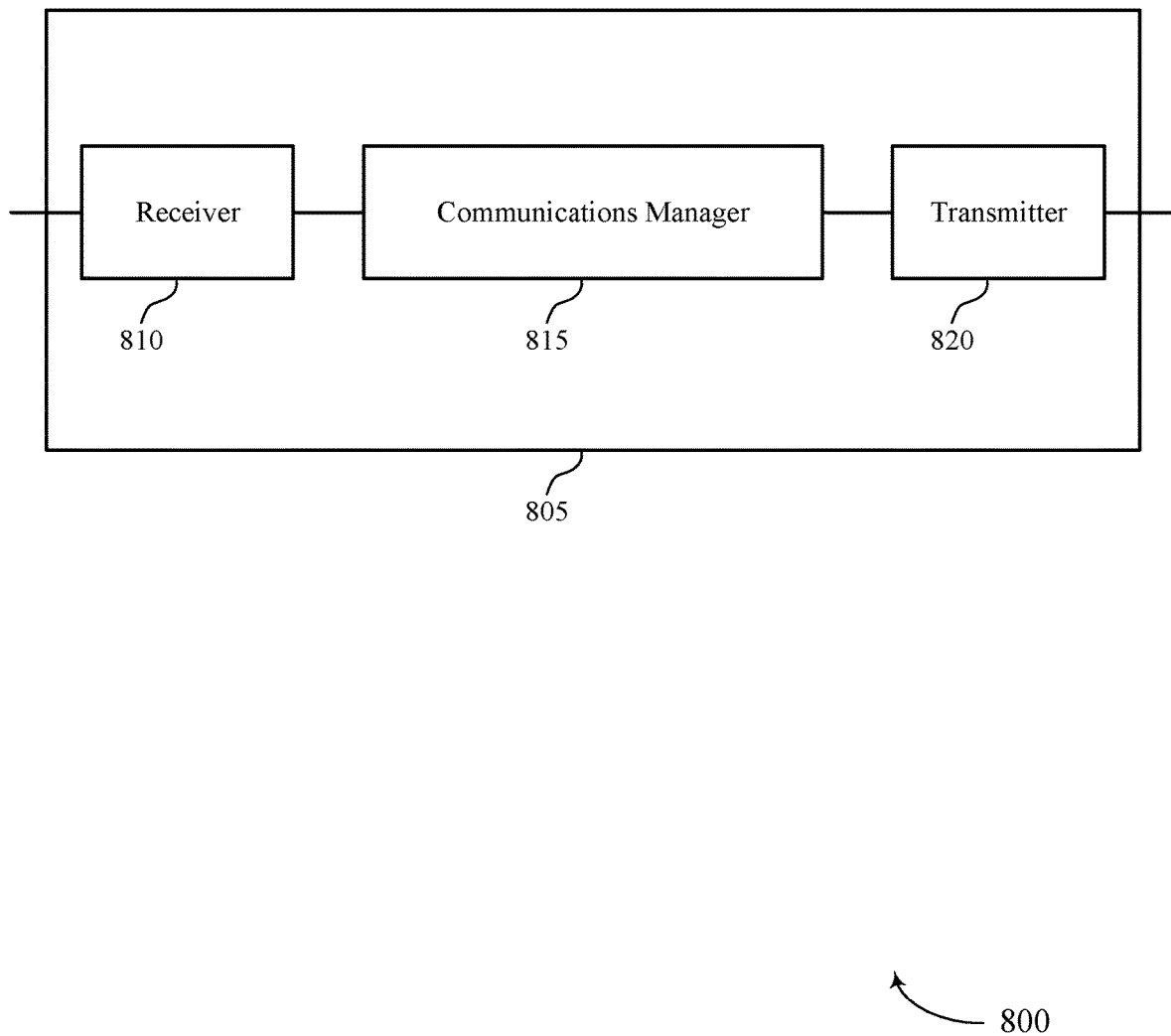
FIGS. 8 and 9 show block diagrams of devices that support timing information for multiple periodic traffic streams sharing a same quality of service in accordance with aspects of the present disclosure.

FIG. 8 shows a block diagram 800 of a device 805 that supports timing information for multiple periodic traffic streams sharing a same quality of service in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to timing information for multiple periodic traffic streams sharing a same quality of service, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive a request to establish a data flow with a UE, the data flow being associated with a QoS class, where the UE supports a plurality of traffic streams. In some cases, the UE communicates with a set of downstream endpoints via the plurality of traffic streams, each traffic stream being between a downstream endpoint and an upstream endpoint via both the UE and the first node of the RAN, and receive timing information for the data flow via one or more system messages associated with the data flow, where the timing information is based on the plurality of traffic streams associated with the QoS class of the data flow, and establish the data flow based on the timing information. In some cases, the timing information may be included in a QoS parameter set received by the communications manager 815 of the device 805. In some cases, the timing information may include a first periodicity parameter and a first timing offset indication parameter for a first traffic stream and a second periodicity parameter and a second timing offset indication parameter for a second traffic stream, where the first traffic stream and the second traffic stream are traffic streams of the plurality of traffic streams associated with the QoS class of the data flow. In some cases, the second timing offset indication parameter has an offset value different from an offset value of the first timing offset indication parameter. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

In some examples, the communications manager 815 may be implemented as an integrated circuit or chipset for a mobile device modem of device 805, and the receiver 810 and transmitter 820 may be implemented as analog components (e.g., amplifiers, filters, antennas) coupled with the mobile device modem to enable wireless transmission and reception over one or more frequency bands.

The communications manager 815 as described herein may be implemented to realize one or more potential advantages. One implementation may allow the device 805 to maintain time synchronization between TSN endpoints. This synchronization between TSN endpoints may increase reliability and reduce latency during transmissions.

Based on techniques for supporting timing information for multiple periodic traffic streams sharing a same quality of service as described herein, one or more processors of a UE 115 (e.g., one or more processors for controlling the receiver 810, the transmitter 820, or the transceiver 1120 as described with reference to FIG. 11) may increase reliability and decrease signaling overhead in communication because the UE 115 may avoid going through unnecessary configuration processes during transmissions.

Figure 9:
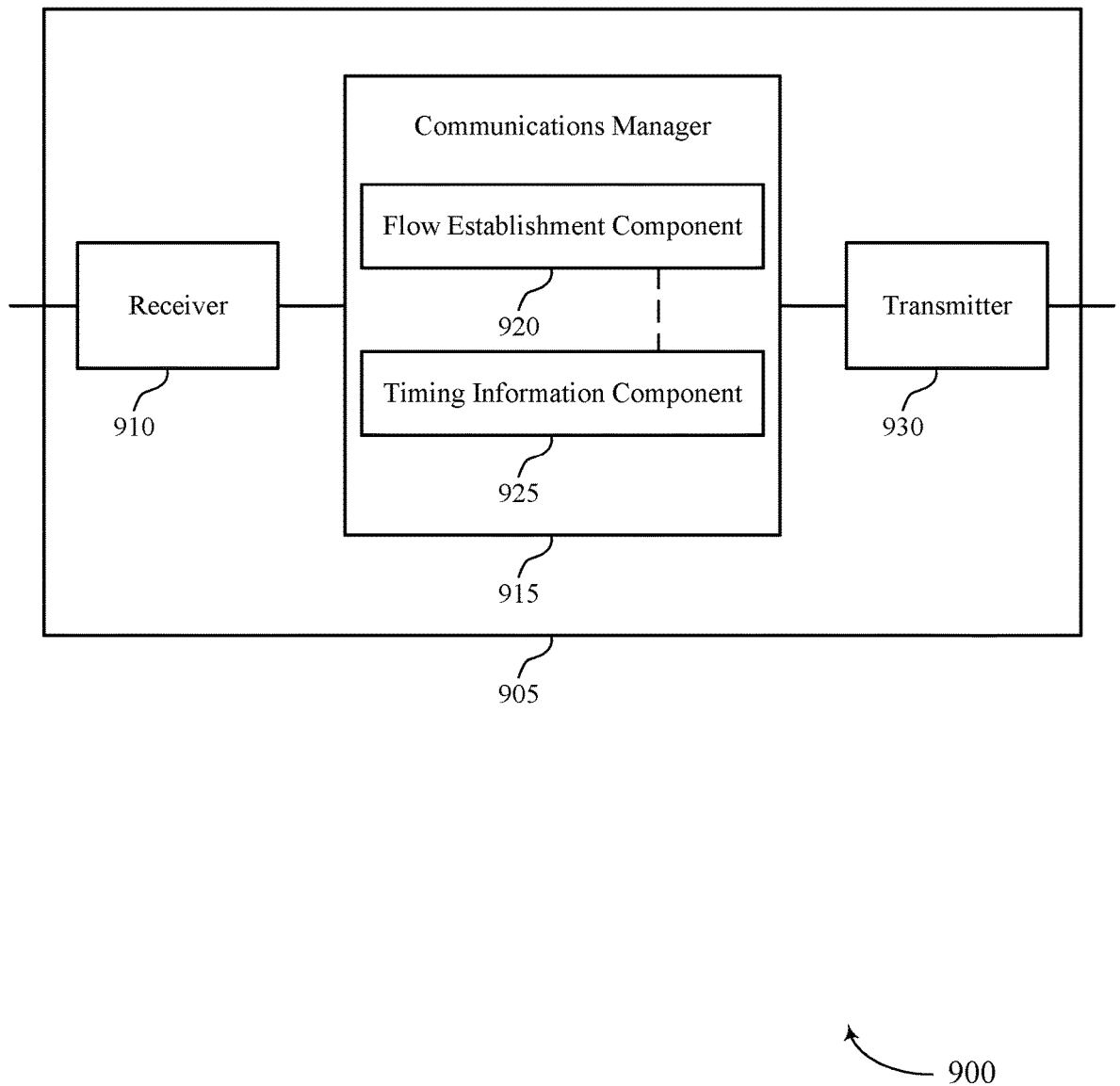

FIG. 9 shows a block diagram 900 of a device 905 that supports timing information for multiple periodic traffic streams sharing a same quality of service in accordance with aspects of the present disclosure. The device 905 may be an example of aspects of a device 805, or a base station 105 as described herein. The device 905 may include a receiver 910, a communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to timing information for multiple periodic traffic streams sharing a same quality of service, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a flow establishment component 920 and a timing information component 925. The communications manager 915 may be an example of aspects of the communications manager 1110 described herein.

The flow establishment component 920 may receive a request to establish a data flow with a UE, the data flow being associated with a QoS class, where the UE supports a plurality of traffic streams, each traffic stream being between a downstream endpoint and an upstream endpoint via both the UE and the first node of the RAN and establish the data flow based on the timing information.

The timing information component 925 may receive timing information for the data flow via one or more system messages associated with the data flow, where the timing information is based on a set of traffic streams associated with the QoS class of the data flow.

The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas.

In some examples, the communications manager 915 may be implemented as an integrated circuit or chipset for a mobile device modem of device 905, and the receiver 910 and transmitter 930 may be implemented as analog components (e.g., amplifiers, filters, antennas) coupled with the mobile device modem to enable wireless transmission and reception over one or more frequency bands.

The communications manager 915 as described herein may be implemented to realize one or more potential advantages. One implementation may allow the device 905 to maintain time synchronization between TSN endpoints. This synchronization between TSN endpoints may increase reliability and reduce latency during transmissions.

Based on techniques for supporting timing information for multiple periodic traffic streams sharing a same quality of service as described herein, one or more processors of a UE 115 (e.g., one or more processors for controlling the receiver 910, the transmitter 930, or the transceiver 1120 as described with reference to FIG. 11) may increase reliability and decrease signaling overhead in the communications because the UE 115 may avoid going through unnecessary configuration processes during transmissions.

Figure 10:
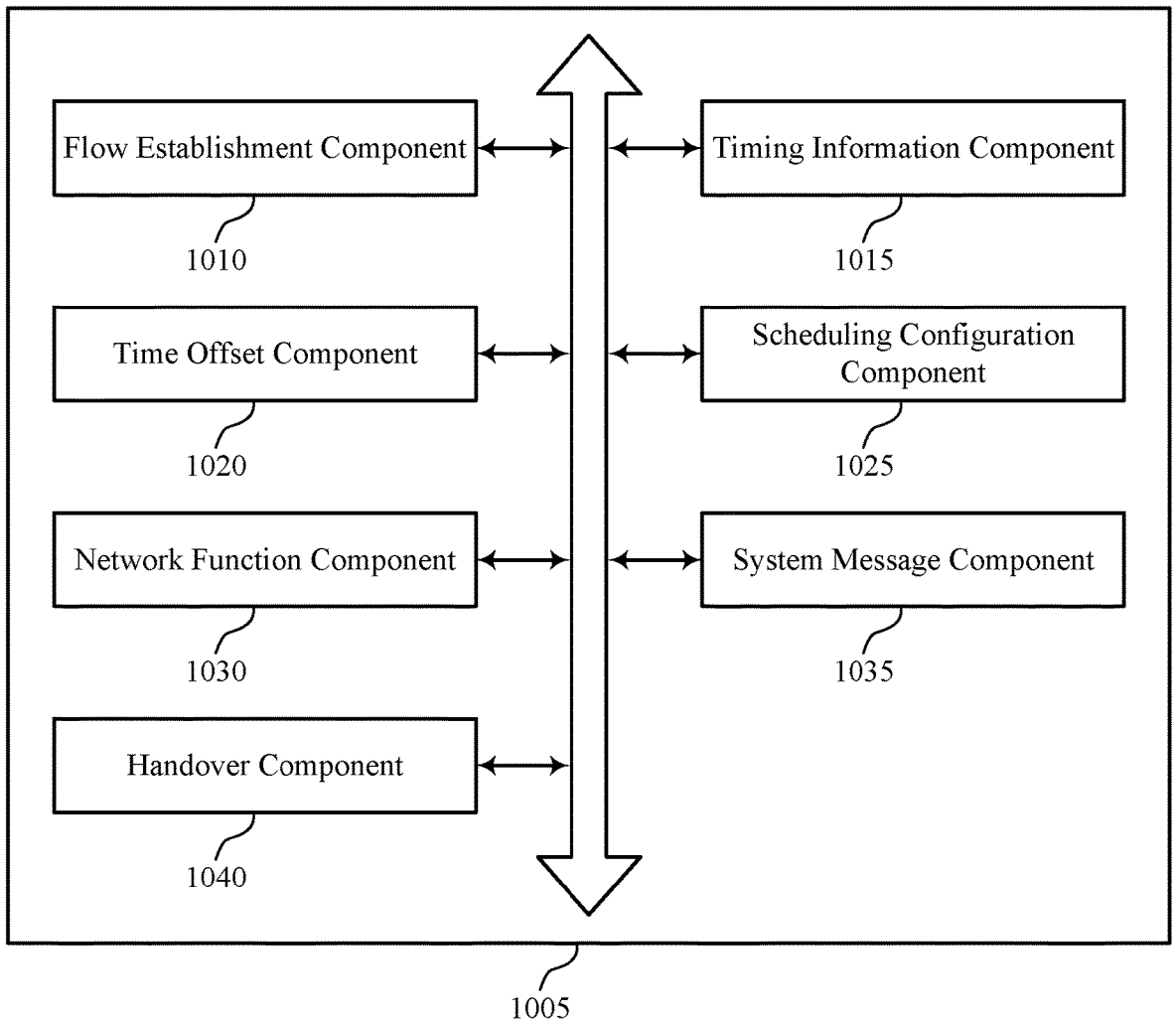
FIG. 10 shows a block diagram of a communications manager that supports timing information for multiple periodic traffic streams sharing a same quality of service in accordance with aspects of the present disclosure.

FIG. 10 shows a block diagram 1000 of a communications manager 1005 that supports timing information for multiple periodic traffic streams sharing a same quality of service in accordance with aspects of the present disclosure. The communications manager 1005 may be an example of aspects of a communications manager 815, a communications manager 915, or a communications manager 1110 described herein. The communications manager 1005 may include a flow establishment component 1010, a timing information component 1015, a time offset component 1020, a scheduling configuration component 1025, a network function component 1030, a system message component 1035, and a handover component 1040. Each of these modules may communicate, directly or indirectly, with one another (e.g., via one or more buses).

The flow establishment component 1010 may receive a request to establish a data flow with a UE, the data flow being associated with a QoS class, where the UE supports a plurality of traffic streams, each traffic stream being between a downstream endpoint and an upstream endpoint via both the UE and the first node of the RAN.

In some examples, the flow establishment component 1010 may establish the data flow based on the timing information.

In some cases, the set of traffic streams associated with the QoS class of the data flow include aperiodic traffic streams, periodic traffic streams, or a combination thereof.

In some cases, the first node of the RAN is a base station or a UPF associated with the RAN.

The timing information component 1015 may receive timing information for the data flow via one or more system messages associated with the data flow, where the timing information is based on a set of traffic streams associated with the QoS class of the data flow.

In some examples, the timing information component 1015 may receive timing information that is based on a period and an offset for each of the set of traffic streams associated with the QoS class of the data flow.

In some examples, the timing information component 1015 may receive one or more of a traffic periodicity, a traffic direction, a bit rate parameter, a PDB parameter, a PER parameter, a burst size parameter, or one or more packet size parameters associated with one or more of the traffic streams associated with the QoS class of the data flow.

The time offset component 1020 may receive a set of time offset indications associated with communicating with the set of downstream endpoints, where the downstream endpoint is a TSN endpoint.

In some examples, the time offset component 1020 may receive one or more of an uplink time offset, a downlink time offset, or a time offset associated with a first downstream endpoint of the set of downstream endpoints, for one or more traffic streams of the set of traffic streams associated with the QoS class of the data flow.

In some examples, the time offset component 1020 may apply each of the set of time offset indications with respect to a TSN time reference, where the TSN time reference is one of a set of TSN time references associated with the RAN.

In some cases, each of the set of time offset indications includes one or more of a time offset start indication, a time offset end indication, a time offset duration indication, or a packet delivery deadline indication.

The scheduling configuration component 1025 may determine one or more of a SPS configuration, a CS configuration, an indication to establish the data flow, accept a change to the data flow, or a combination thereof.

In some examples, the scheduling configuration component 1025 may configure one or more of SPS, CS, admission control, or a combination thereof, for the data flow.

The network function component 1030 may receive one or more of a TSN adaptation function, an AMF, a UPF, a SMF, a PCF, an application function, or any combinations thereof.

In some examples, the network function component 1030 may apply the timing information based on a timing configuration for the data flow, where the timing information is provided by one or more of a TSN adaptation function, subscription information associated with the UE stored in one or more of an UDR, an AUSF, or a HSS.

In some examples, the network function component 1030 may apply the timing information based on a timing configuration for the data flow, where the timing information is provided by preconfigured information, which may in turn be provided by a network function or a RAN node.

In some cases, the timing information component may receive timing information for the data flow via one or more system messages associated with the data flow, the system messages provided by system component 1035. In some cases, the one or more system messages include a first system message from the TSN adaptation function to the PCF, a second system message from the PCF to the SMF, a third system message from the SMF to the AMF, and a fourth system message from the AMF to the RAN.

In some cases, the one or more system messages include a first system message from the TSN adaptation function to the PCF, a second system message from the PCF to the AMF, and third system message from the AMF to the RAN.

The handover component 1040 may receive a handover message from a second node in the RAN, where the handover message indicates that the data flow is to be handed over from the second node to the first node.

Figure 11:
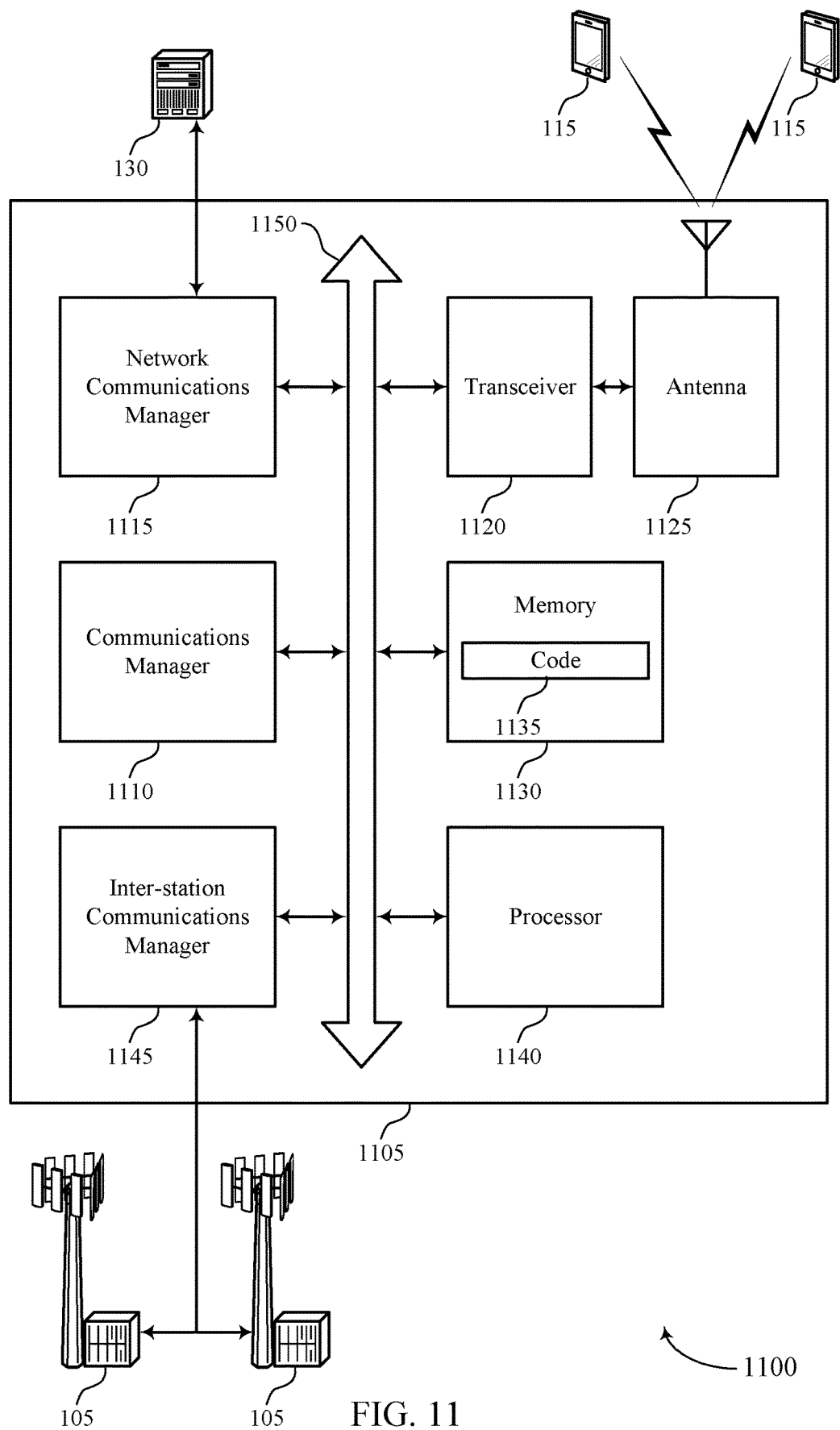
FIG. 11 shows a diagram of a system including a device that supports timing information for multiple periodic traffic streams sharing a same quality of service in accordance with aspects of the present disclosure.

FIG. 11 shows a diagram of a system 1100 including a device 1105 that supports timing information for multiple periodic traffic streams sharing a same quality of service in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may receive a request to establish a data flow with a UE, the data flow being associated with a QoS class, where the UE supports a plurality of traffic streams, each traffic stream being between a downstream endpoint and an upstream endpoint via both the UE and the first node of the RAN, establish the data flow based on the timing information, and receive timing information for the data flow via one or more system messages associated with the data flow, where the timing information is based on the plurality of traffic streams associated with the QoS class of the data flow.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases, the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a basic input basic output (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting timing information for multiple periodic traffic streams sharing a same quality of service).

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
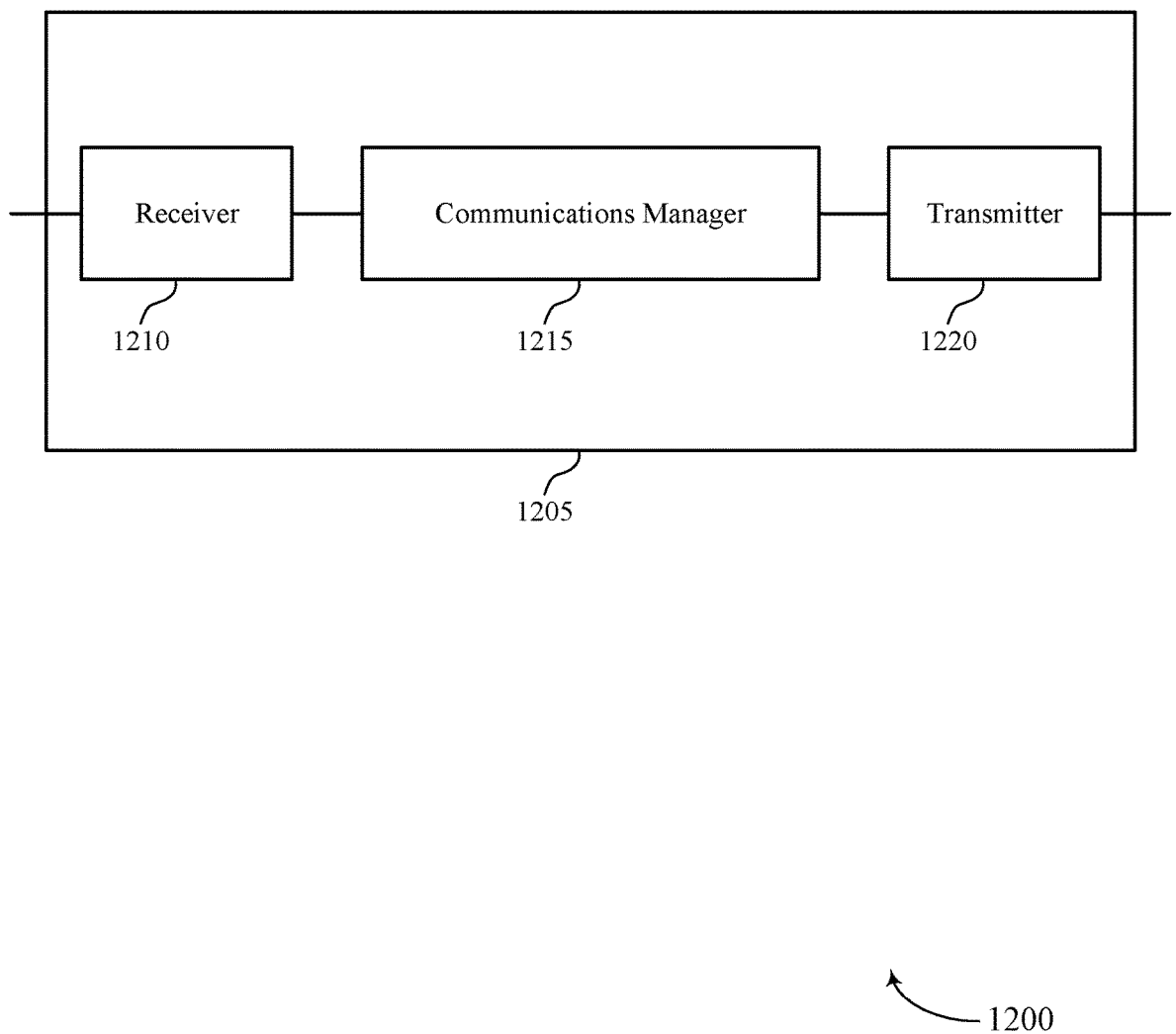
FIGS. 12 and 13 show block diagrams of devices that support timing information for multiple periodic traffic streams sharing a same quality of service in accordance with aspects of the present disclosure.

FIG. 12 shows a block diagram 1200 of a device 1205 that supports timing information for multiple periodic traffic streams sharing a same quality of service in accordance with aspects of the present disclosure. The device 1205 may be an example of aspects of a network entity as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to timing information for multiple periodic traffic streams sharing a same quality of service, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may establish a data flow between a UE and a first node associated with a radio access network (RAN), the data flow being associated with a QoS class, where the UE supports a plurality of traffic streams, each traffic stream being between a downstream endpoint and an upstream endpoint via both the UE and the first node of the RAN, receive timing information for the data flow via one or more system messages associated with the data flow, the timing information associated with a TSN and at least one TSN adaptation function associated with the RAN, and where the timing information is based on the plurality of traffic streams associated with the QoS class of the data flow, and relay the timing information to one or more other nodes associated with the RAN. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
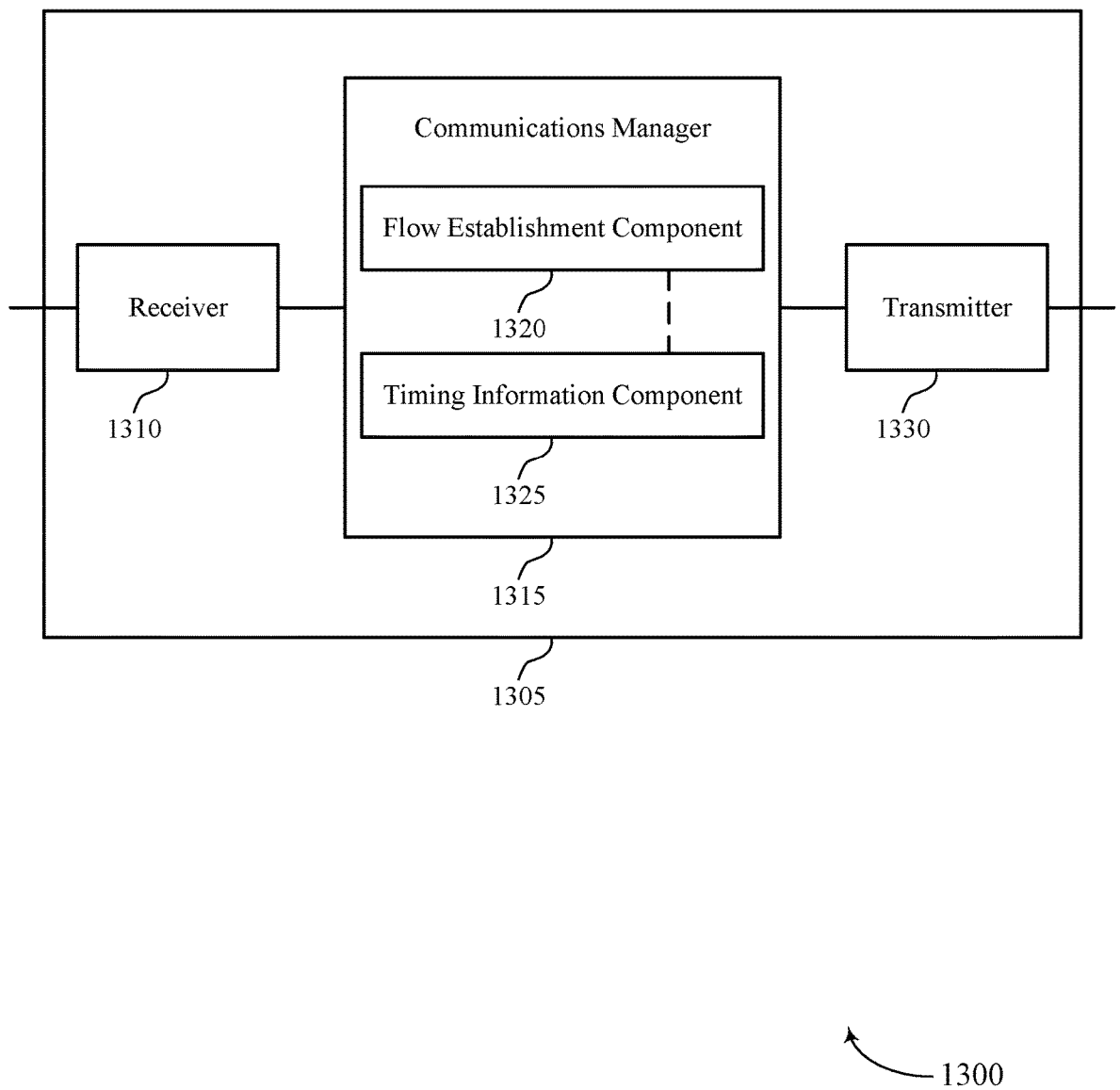

FIG. 13 shows a block diagram 1300 of a device 1305 that supports timing information for multiple periodic traffic streams sharing a same quality of service in accordance with aspects of the present disclosure. The device 1305 may be an example of aspects of a device 1205 or a network entity (e.g., UE 115) as described herein. The device 1305 may include a receiver 1310, a communications manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to timing information for multiple periodic traffic streams sharing a same quality of service, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a flow establishment component 1320 and a timing information component 1325. The communications manager 1315 may be an example of aspects of the communications manager 1510 described herein.

The flow establishment component 1320 may establish a data flow between a UE and a first node associated with a RAN, the data flow being associated with a QoS class, where the UE supports a plurality of traffic streams, each traffic stream being between a downstream endpoint and an upstream endpoint via both the UE and the first node of the RAN.

The timing information component 1325 may receive timing information for the data flow via one or more system messages associated with the data flow, the timing information associated with a TSN and at least one TSN adaptation function associated with the RAN, where the timing information is based on a set of traffic streams associated with the QoS class of the data flow and relay the timing information to one or more other nodes associated with the RAN.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1520 described with reference to FIG. 15. The transmitter 1330 may utilize a single antenna or a set of antennas.

Figure 14:
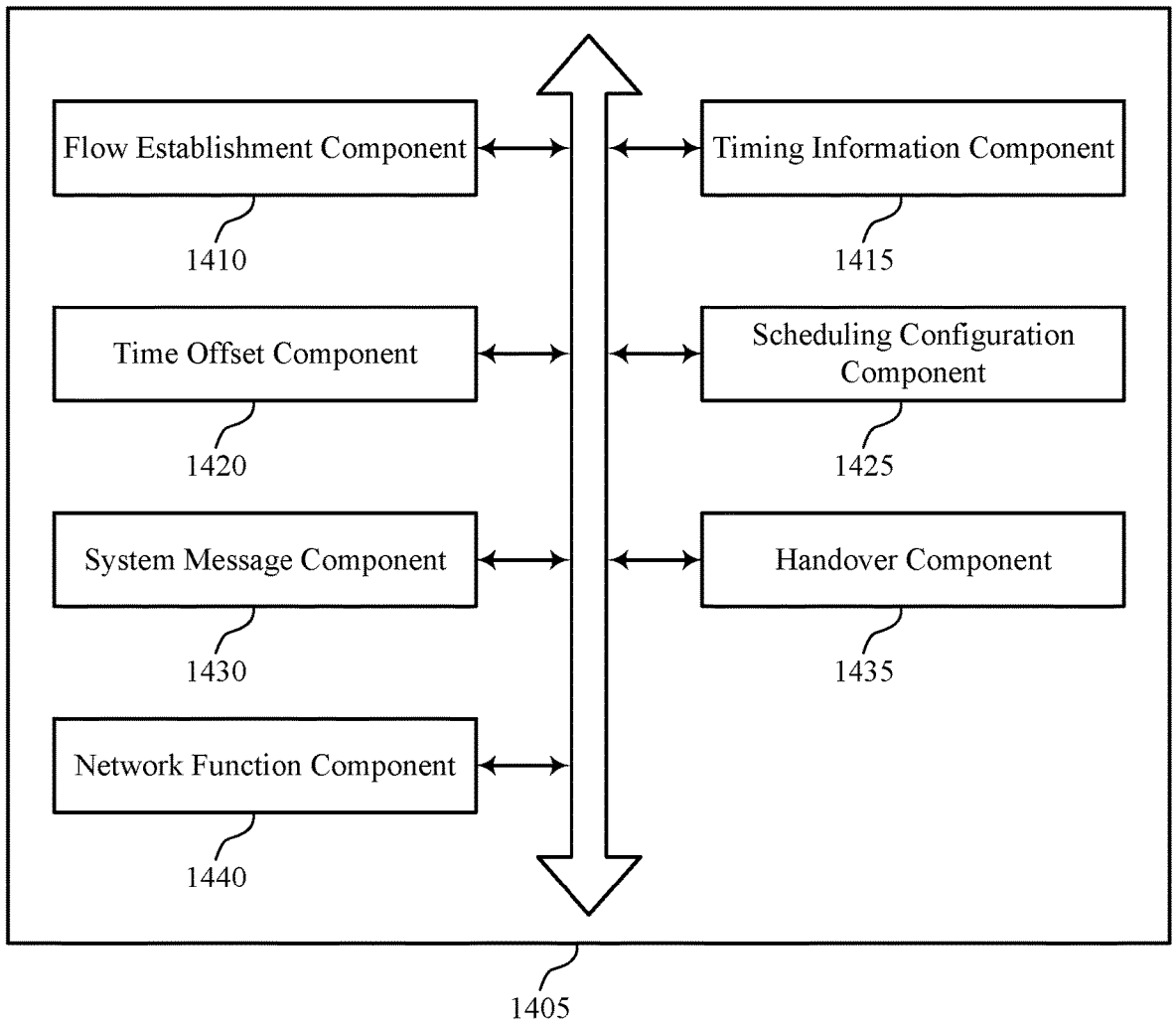
FIG. 14 shows a block diagram of a communications manager that supports timing information for multiple periodic traffic streams sharing a same quality of service in accordance with aspects of the present disclosure.

FIG. 14 shows a block diagram 1400 of a communications manager 1405 that supports timing information for multiple periodic traffic streams sharing a same quality of service in accordance with aspects of the present disclosure. The communications manager 1405 may be an example of aspects of a communications manager 1215, a communications manager 1315, or a communications manager 1510 described herein. The communications manager 1405 may include a flow establishment component 1410, a timing information component 1415, a time offset component 1420, a scheduling configuration component 1425, a system message component 1430, a handover component 1435, and a network function component 1440. Each of these modules may communicate, directly or indirectly, with one another (e.g., via one or more buses).

The flow establishment component 1410 may establish a data flow between a UE and a first node associated with a RAN, the data flow being associated with a QoS class, where the UE communicates with a set of downstream endpoints via respective traffic streams, each traffic stream being between a downstream endpoint and an upstream endpoint via both the UE and the first node of the RAN.

In some examples, the flow establishment component 1410 may include the timing information with configuration information for the data flow, where the configuration information is included in one or more of a QoS profile associated with the data flow, one or more QoS rules associated with the data flow, or one or more PDRs associated with the data flow.

In some examples, the flow establishment component 1410 may provide at least a portion of the data flow via communications between the set of downlink endpoints and a set of corresponding uplink endpoints, based on the timing information.

In some cases, the set of traffic streams associated with the QoS class of the data flow include aperiodic traffic streams, periodic traffic streams, or a combination thereof.

In some cases, the first node of the RAN is a base station or a UPF associated with the RAN.

The timing information component 1415 may receive timing information for the data flow via one or more system messages associated with the data flow, the timing information associated with a TSN and at least one TSN adaptation function associated with the RAN, and where the timing information is based on a set of traffic streams associated with the QoS class of the data flow.

In some examples, the timing information component 1415 may relay the timing information to one or more other nodes associated with the RAN.

In some examples, the timing information component 1415 may receive timing information that is based on a period and an offset for each of the set of traffic streams associated with the QoS class of the data flow.

In some examples, the timing information component 1415 may receive one or more of a traffic periodicity, a traffic direction, a bit rate parameter, a PDB parameter, a PER parameter, a burst size parameter, or one or more packet size parameters associated with one or more of the traffic streams associated with the QoS class of the data flow.

The time offset component 1420 may receive a set of time offset indications associated with communicating between the set of downlink endpoints and a set of corresponding uplink endpoints.

In some examples, the time offset component 1420 may receive one or more of an uplink time offset, a downlink time offset, or a time offset associated with a first downlink endpoint of the set of downlink endpoints, for one or more traffic streams of the set of traffic streams associated with the QoS class of the data flow.

In some examples, the time offset component 1420 may determine each of the set of time offset indications with respect to a TSN time reference, where the TSN time reference is one of a set of TSN time references associated with the RAN.

In some cases, each of the set of time offset indications include one or more of a time offset start indication, a time offset end indication, a time offset duration indication, and a packet delivery deadline indication.

The scheduling configuration component 1425 may determine one or more of a SPS configuration, a CS configuration, an indication to establish the data flow, accept a change to the data flow, or a combination thereof.

The system message component 1430 may receive a first system message from a network function associated with the first node, or a second system message from a different node in the RAN, or a combination thereof.

The handover component 1435 may receive a handover message from a second node in the RAN, where the handover message indicates that the data flow is to be handed over from the second node to the first node, or receive a handover message from a network function associated with the RAN that an aspect related to the data flow is to be handed over from the network function to a different network function.

The network function component 1440 may determine the timing information based on a timing configuration for the data flow, where the timing information is provided by one or more of.

In some examples, the timing information may be provided by network function component 1440, such as via subscription information associated with the UE stored in one or more of an UDR, an AUSF, or a HSS.

In some examples, the timing information provided by network function component 1440 may be preconfigured information provided by a network function or a RAN node.

Figure 15:
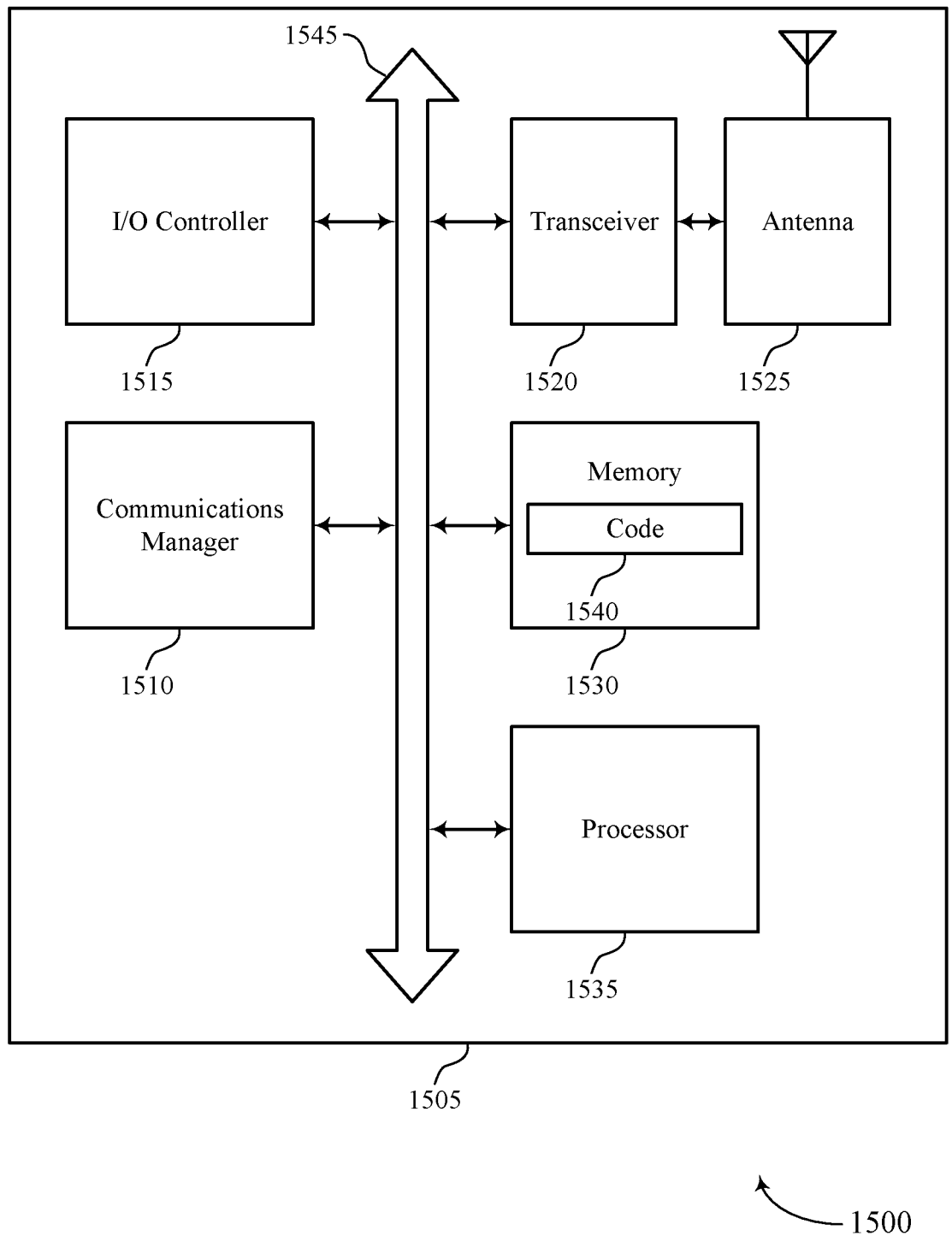
FIG. 15 shows a diagram of a system including a device that supports timing information for multiple periodic traffic streams sharing a same quality of service in accordance with aspects of the present disclosure.

FIG. 15 shows a diagram of a system 1500 including a device 1505 that supports timing information for multiple periodic traffic streams sharing a same quality of service in accordance with aspects of the present disclosure. The device 1505 may be an example of or include the components of device 1205, device 1305, or a network entity as described herein. The device 1505 may include components for bi-directional voice and data communications including components for transmitting and receiving communications, including a communications manager 1510, an I/O controller 1515, a transceiver 1520, an antenna 1525, memory 1530, and a processor 1535. These components may be in electronic communication via one or more buses (e.g., bus 1545).

The communications manager 1510 may establish a data flow between a UE and a first node associated with a RAN, the data flow being associated with a QoS class, where the UE supports a plurality of traffic streams, each traffic stream being between a downstream endpoint and an upstream endpoint via both the UE and the first node of the RAN, receive timing information for the data flow via one or more system messages associated with the data flow, the timing information associated with a TSN and at least one TSN adaptation function associated with the RAN, and where the timing information is based on a set of traffic streams associated with the QoS class of the data flow, and relay the timing information to one or more other nodes associated with the RAN.

The I/O controller 1515 may manage input and output signals for the device 1505. The I/O controller 1515 may also manage peripherals not integrated into the device 1505. In some cases, the I/O controller 1515 may represent a physical connection or port to an external peripheral. In some cases, the I/O controller 1515 may utilize an operating system such as iOS®, ANDROID®, MS-DOS®, MS-WINDOWS®, OS/2®, UNIX®, LINUX®, or another known operating system. In other cases, the I/O controller 1515 may represent or interact with a modem, a keyboard, a mouse, a touchscreen, or a similar device. In some cases, the I/O controller 1515 may be implemented as part of a processor. In some cases, a user may interact with the device 1505 via the I/O controller 1515 or via hardware components controlled by the I/O controller 1515.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include random-access memory (RAM) and read-only memory (ROM). The memory 1530 may store computer-readable, computer-executable code 1540 including instructions that, when executed, cause the processor to perform various functions described herein. In some cases, the memory 1530 may contain, among other things, a BIOS which may control basic hardware or software operation such as the interaction with peripheral components or devices.

The processor 1535 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1535 may be configured to operate a memory array using a memory controller. In other cases, a memory controller may be integrated into the processor 1535. The processor 1535 may be configured to execute computer-readable instructions stored in a memory (e.g., the memory 1530) to cause the device 1505 to perform various functions (e.g., functions or tasks supporting timing information for multiple periodic traffic streams sharing a same quality of service).

The code 1540 may include instructions to implement aspects of the present disclosure, including instructions to support wireless communications. The code 1540 may be stored in a non-transitory computer-readable medium such as system memory or other type of memory. In some cases, the code 1540 may not be directly executable by the processor 1535 but may cause a computer (e.g., when compiled and executed) to perform functions described herein.

Figure 16:
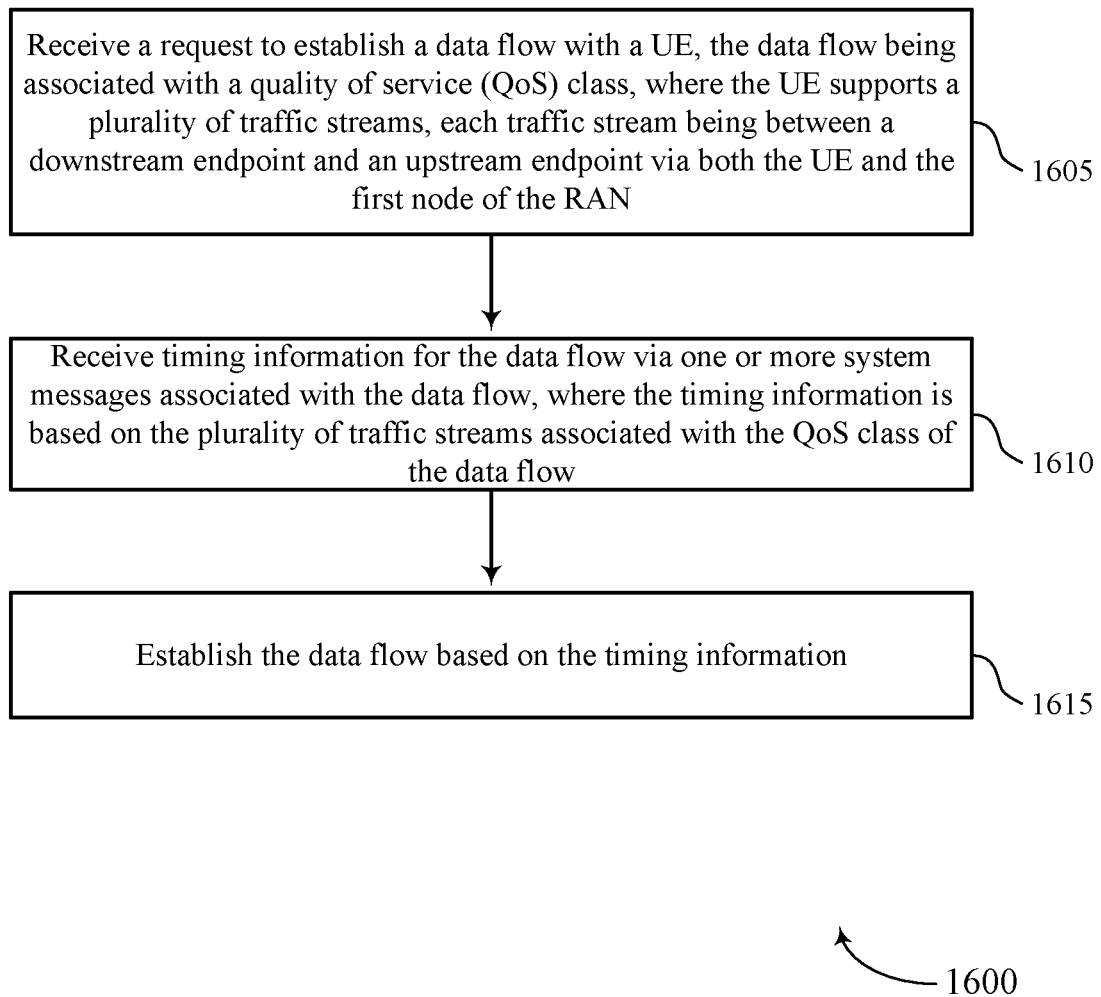
FIGS. 16 and 17 show flowcharts illustrating methods that support timing information for multiple periodic traffic streams sharing a same quality of service in accordance with aspects of the present disclosure.

FIG. 16 shows a flowchart illustrating a method 1600 that supports timing information for multiple periodic traffic streams sharing a same quality of service in accordance with aspects of the present disclosure. The operations of method 1600 may be implemented by a base station 105 or its components as described herein. For example, the operations of method 1600 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1605, a first node of the RAN may receive a request to establish a data flow with a UE, the data flow being associated with a QoS class, where the UE supports a plurality of traffic streams, each traffic stream being between a downstream endpoint and an upstream endpoint via both the UE and the first node of the RAN. In some cases, the first node of the RAN is a base station or a UPF associated with the RAN. The operations of 1605 may be performed according to the methods described herein. In some examples, aspects of the operations of 1605 may be performed by a flow establishment component as described with reference to FIGS. 8 through 11.

At 1610, the base station may receive timing information for the data flow via one or more system messages associated with the data flow, where the timing information is based on the plurality of traffic streams associated with the QoS class of the data flow. In some aspects, the received timing information received is based on a period and an offset for each of the set of traffic streams associated with the QoS class of the data flow. The operations of 1610 may be performed according to the methods described herein. In some examples, aspects of the operations of 1610 may be performed by a timing information component as described with reference to FIGS. 8 through 11.

At 1615, the base station may establish the data flow based on the timing information. The operations of 1615 may be performed according to the methods described herein. In some examples, aspects of the operations of 1615 may be performed by a flow establishment component as described with reference to FIGS. 8 through 11. As previously described, establishing the data flow may comprise the base station configuring one or more of SPS, CS, admission control, or a combination thereof, for the data flow. In some cases, the configuring may be performed by a scheduling configuration component as described with reference to FIGS. 8 through 11.

Figure 17:
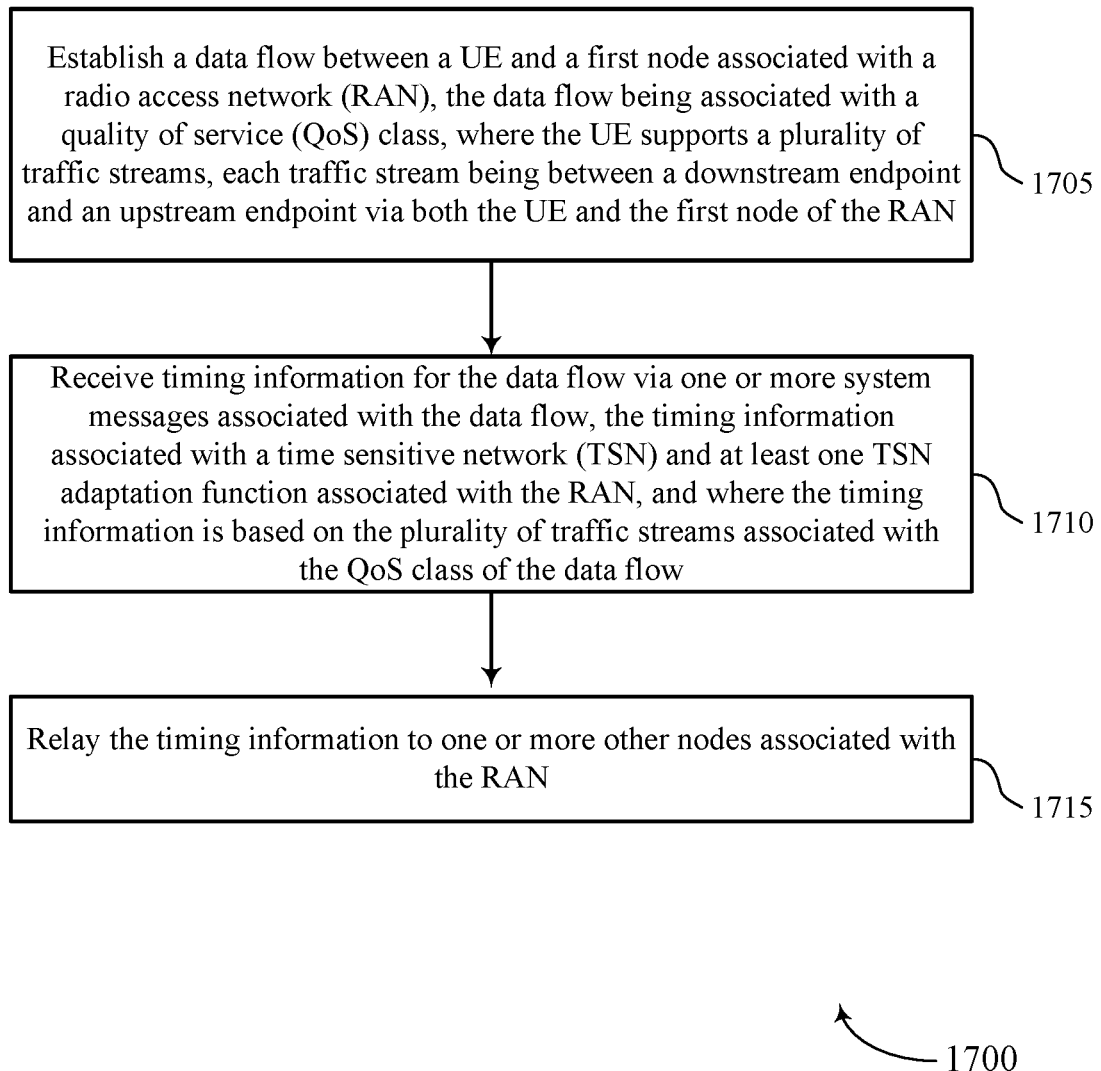

FIG. 17 shows a flowchart illustrating a method 1700 that supports timing information for multiple periodic traffic streams sharing a same quality of service in accordance with aspects of the present disclosure. The operations of method 1700 may be implemented by a network entity or its components as described herein. For example, the operations of method 1700 may be performed by a communications manager as described with reference to FIGS. 12 through 15. In some examples, a network entity may execute a set of instructions to control the functional elements of the network entity to perform the functions described herein. Additionally or alternatively, a network entity may perform aspects of the functions described herein using special-purpose hardware.

At 1705, the network entity may establish a data flow between a UE and a first node associated with a RAN, the data flow being associated with a QoS class, where the UE supports a plurality of traffic streams, each traffic stream being between a downstream endpoint and an upstream endpoint via both the UE and the first node of the RAN. The operations of 1705 may be performed according to the methods described herein. In some examples, aspects of the operations of 1705 may be performed by a flow establishment component as described with reference to FIGS. 12 through 15.

At 1710, the network entity may receive timing information for the data flow via one or more system messages associated with the data flow, the timing information associated with a TSN and at least one TSN adaptation function associated with the RAN, where the timing information is based on the plurality of traffic streams associated with the QoS class of the data flow. The operations of 1710 may be performed according to the methods described herein. In some examples, aspects of the operations of 1710 may be performed by a timing information component as described with reference to FIGS. 12 through 15.

In some cases, the timing information received by the network entity may be based on a period and an offset for each of the plurality of traffic streams associated with the QoS class of the data flow. The operations of 1710 may be performed according to the methods described herein. In some examples, aspects of the operations of 1710 may be performed by a timing information component as described with reference to FIGS. 12 through 15.

At 1715, the network entity may relay the timing information to one or more other nodes associated with the RAN. The operations of 1715 may be performed according to the methods described herein. In some examples, aspects of the operations of 1715 may be performed by a timing information component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first node of a radio access network (RAN), comprising:

receiving a request to establish a data flow with a user equipment (UE), the data flow being associated with a quality of service (QoS) class, wherein the UE supports a plurality of traffic streams, each traffic stream being between a downstream endpoint and an upstream endpoint via both the UE and the first node of the RAN;

receiving timing information for the data flow via one or more system messages associated with the data flow, wherein the timing information comprises a first time offset and a second time offset different from the first time offset, the first time offset corresponding to a first traffic stream and the second time offset corresponding to a second traffic stream, and wherein the first traffic stream and the second traffic stream are of the plurality of traffic streams and are associated with the QoS class of the data flow; and establishing the data flow based at least in part on the timing information.

2. The method of claim 1, wherein the timing information comprises a first period and a second period different from the first period, the first period corresponding to the first traffic stream and the second period corresponding to the second traffic stream.

3. The method of claim 1, wherein the timing information comprises a period corresponding to the first traffic stream and the second traffic stream, and wherein the period, the first time offset, and the time second offset are associated with communicating with the downstream endpoints corresponding to the first traffic stream and the second traffic stream, wherein each of the downstream endpoints is a time sensitive network (TSN) endpoint.

4. The method of claim 1, further comprising:

receiving information for the data flow corresponding to one or more of a traffic direction, a bit rate parameter, a packet data budget (PDB) parameter, a packet error loss rate (PER) parameter, a burst size parameter, or one or more packet size parameters associated with the first traffic stream and the second traffic stream associated with the QoS class of the data flow.

5. The method of claim 1, wherein the first time offset is an uplink time offset or a downlink time offset associated with a first downstream endpoint of the first traffic stream associated with the QoS class of the data flow.

6. The method of claim 1, further comprising at least one of:

determining one or more of a semi-persistent scheduling (SPS) configuration or a configured scheduling (CS) configuration based at least in part on the timing information; or receiving an indication to establish the data flow or an indication to accept a change to the data flow.

7. The method of claim 1, wherein the first time offset is an indication that includes one or more of a time offset start indication, a time offset end indication, a time offset duration indication, or a packet delivery deadline indication.

8. The method of claim 1, further comprising:
applying the first time offset and the second time offset with respect to a time sensitive network (TSN) time reference, and wherein the TSN time reference is one of a plurality of TSN time references associated with the RAN.

9. The method of claim 1, wherein the plurality of traffic streams associated with the QoS class of the data flow comprise at least one of aperiodic traffic streams or periodic traffic streams.

10. The method of claim 1, wherein establishing the data flow comprises:
configuring at least one of semi-persistent scheduling (SPS), configured scheduling (CS), or admission control for the data flow.

11. The method of claim 1, wherein the receiving the timing information for the data flow comprises:
receiving the timing information from at least one of a time sensitive network (TSN) adaptation function, an access and mobility management function (AMF), a user plane function (UPF), a session management function (SMF), a policy control function (PCF), or an application function.

12. The method of claim 11, wherein the one or more system messages comprise a first system message from the TSN adaptation function to the PCF, a second system message from the PCF to the SMF, a third system message from the SMF to the AMF, and a fourth system message from the AMF to the RAN.

13. The method of claim 11, wherein the one or more system messages comprise a first system message from the TSN adaptation function to the PCF, a second system message from the PCF to the AMF, and third system message from the AMF to the RAN.

14. The method of claim 1, wherein establishing the data flow comprises:
receiving a handover message from a second node in the RAN, wherein the handover message indicates that the data flow is to be handed over from the second node to the first node.

15. The method of claim 1, wherein the first node of the RAN is a base station or a user plane function (UPF) associated with the RAN.

16. A method for wireless communication at a network entity, comprising:
establishing a data flow between a user equipment (UE) and a first node associated with a radio access network (RAN), the data flow being associated with a quality of service (QoS) class, wherein the UE supports a plurality of traffic streams, each traffic stream being between a downstream endpoint and an upstream endpoint via both the UE and the first node of the RAN;
receiving timing information for the data flow via one or more system messages associated with the data flow, the timing information associated with a time sensitive network (TSN) and at least one TSN adaptation function associated with the RAN, wherein the timing information comprises a first time offset and a second time offset different from the first time offset, the first time offset corresponding to a first traffic stream and the second time offset corresponding to a second traffic stream, and wherein the first traffic stream and the second traffic stream are of the plurality of traffic streams and are associated with the QoS class of the data flow; and
relaying the timing information to one or more other nodes associated with the RAN.

17. The method of claim 16, wherein
the timing information comprises a first period and a second period different from the first period, the first period corresponding to the first traffic stream and the second period corresponding to the second traffic stream.

18. The method of claim 16, further comprising:
receiving information for the data flow corresponding to one or more of a traffic direction, a bit rate parameter, a packet data budget (PDB) parameter, a packet error loss rate (PER) parameter, a burst size parameter, or one or more packet size parameters associated with the first traffic stream and the second traffic stream associated with the QoS class of the data flow.

19. The method of claim 16, wherein
the first time offset is an uplink time offset or a downlink time offset, or a time offset associated with a first downlink endpoint of the first traffic stream associated with the QoS class of the data flow.

20. The method of claim 16, further comprising at least one of:
determining a semi-persistent scheduling (SPS) configuration or a configured scheduling (CS) configuration based at least in part on the timing information; or
receiving an indication to establish the data flow or an indication to accept a change to the data flow.

21. The method of claim 16, wherein the first time offset is an indication that includes one or more of a time offset start indication, a time offset end indication, a time offset duration indication, and a packet delivery deadline indication.

22. The method of claim 16, further comprising:
determining the first time offset and the second time offset with respect to a TSN time reference, wherein the TSN time reference is one of a plurality of TSN time references associated with the RAN.

23. The method of claim 16, further comprising:
including the timing information with configuration information for the data flow, wherein the configuration information is included in one or more of a quality of service (QoS) profile associated with the data flow, one or more QoS rules associated with the data flow, or one or more packet detection rules (PDRs) associated with the data flow.

24. The method of claim 16, further comprising:
providing at least a portion of the data flow via communications between a set of downlink endpoints and a set of corresponding uplink endpoints, based at least in part on the timing information.

25. The method of claim 16, wherein the receiving the timing information for the data flow comprises at least one of:
receiving a first system message from a network function associated with the first node; or
receiving a second system message from a different node in the RAN.

26. The method of claim 16, wherein establishing the data flow comprises at least one of:
receiving a handover message from a second node in the RAN, wherein the handover message indicates that the data flow is to be handed over from the second node to the first node; or
receiving a handover message from a network function associated with the RAN that an aspect related to the data flow is to be handed over from the network function to a different network function.

27. The method of claim 16, wherein the first node of the RAN is a base station or a user plane function (UPF) associated with the RAN.

28. The method of claim 16, further comprising:
determining the timing information based at least in part on a timing configuration for the data flow, wherein the timing information is provided by at least one of the TSN adaptation function, subscription information associated with the UE stored in one or more of a unified data repository (UDR), an authentication server function (AUSF), or a home subscriber server (HSS), or preconfigured information provided by a network function or a RAN node.

29. An apparatus for wireless communication at a first node of a radio access network (RAN), comprising:
a processor,
memory coupled with the processor; and
instructions stored in the memory and executable by the processor to cause the apparatus to:
receive a request to establish a data flow with a user equipment (UE), the data flow being associated with a quality of service (QoS) class, wherein the UE supports a plurality of traffic streams, each traffic stream being between a downstream endpoint and an upstream endpoint via both the UE and the first node of the RAN;
receive timing information for the data flow via one or more system messages associated with the data flow, wherein the timing information comprises a first time offset and a second time offset different from the first time offset, the first time offset corresponding to a first traffic stream and the second time offset corresponding to a second traffic stream, and wherein the first traffic stream and the second traffic stream are of the plurality of traffic streams and are associated with the QoS class of the data flow; and
establish the data flow based at least in part on the timing information.

30. An apparatus for wireless communication at a network entity, comprising:
a processor,
memory coupled with the processor; and
instructions stored in the memory and executable by the processor to cause the apparatus to:
establish a data flow between a user equipment (UE) and a first node associated with a radio access network (RAN), the data flow being associated with a quality of service (QoS) class, wherein the UE supports a plurality of traffic streams, each traffic stream being between a downstream endpoint and an upstream endpoint via both the UE and the first node of the RAN;
receive timing information for the data flow via one or more system messages associated with the data flow, the timing information associated with a time sensitive network (TSN) and at least one TSN adaptation function associated with the RAN, wherein the timing information comprises a first time offset and a second time offset different from the first time offset, the first time offset corresponding to a first traffic stream and the second time offset corresponding to a second traffic stream, and wherein the first traffic stream and the second traffic stream are of the plurality of traffic streams and are associated with the QoS class of the data flow; and
relay the timing information to one or more other nodes associated with the RAN.

* * * * *